(12) United States Patent
Portail et al.

(10) Patent No.: US 11,861,843 B2
(45) Date of Patent: Jan. 2, 2024

(54) SYSTEM AND METHOD FOR OBJECT ANALYSIS

(71) Applicant: Cape Analytics, Inc., Palo Alto, CA (US)

(72) Inventors: Matthieu Portail, Palo Alto, CA (US); Christopher Wegg, Palo Alto, CA (US); Mohammad-Ali Nikouei, Palo Alto, CA (US)

(73) Assignee: Cape Analytics, Inc., Palo Alto, CA (US)

( * ) Notice: Subject to any disclaimer, the term of this patent is extended or adjusted under 35 U.S.C. 154(b) by 0 days.

(21) Appl. No.: 18/098,829

(22) Filed: Jan. 19, 2023

(65) Prior Publication Data

US 2023/0230220 A1   Jul. 20, 2023

Related U.S. Application Data

(60) Provisional application No. 63/300,736, filed on Jan. 19, 2022.

(51) Int. Cl.
*G06T 7/11* (2017.01)
*G06F 18/22* (2023.01)
(Continued)

(52) U.S. Cl.
CPC ............... *G06T 7/11* (2017.01); *G01C 11/06* (2013.01); *G06F 16/432* (2019.01); *G06F 16/489* (2019.01); *G06F 18/22* (2023.01); *G06T 7/0004* (2013.01); *G06T 7/60* (2013.01); *G06T 7/70* (2017.01); *G06T 2207/10024* (2013.01); *G06T 2207/20016* (2013.01); *G06T 2207/20021* (2013.01); *G06T 2207/20081* (2013.01); *G06T 2207/20084* (2013.01); *G06T 2207/30184* (2013.01); *G06T 2207/30242* (2013.01)

(58) Field of Classification Search
CPC ... G06T 7/0004; G06F 16/432; G06F 16/489; G06F 18/22
USPC .................................................. 382/100, 276
See application file for complete search history.

(56) References Cited

U.S. PATENT DOCUMENTS 5,633,946 A   5/1997   Lachinski et al.
6,044,171 A   3/2000   Polyakov et al.
(Continued)

FOREIGN PATENT DOCUMENTS

CN   101549596 B   8/2012
CN   108197583 A   6/2018
(Continued)

OTHER PUBLICATIONS

Hamaguchi, Ryuhei, et al., "Rare Event Detection using Disentangled Representation Learning", arXiv:1812.01285, submitted Dec. 4, 2018, 2019 IEEE/CVF Conference on Computer Vision and Pattern Recognition (CVPR) Long Beach, CA, USA, Jun. 15-20, 2019.
(Continued)

*Primary Examiner* — Sheela C Chawan
(74) *Attorney, Agent, or Firm* — Jeffrey Schox; Diana Lin

(57) ABSTRACT

In variants, the method can include: determining a timeseries of measurements of a geographic region; determining a set of object representations from the timeseries of measurements; and determining a timeseries of object versions based on relationships between the object representations.

17 Claims, 17 Drawing Sheets

(51) Int. Cl.
  *G01C 11/06* (2006.01)
  *G06T 7/70* (2017.01)
  *G06T 7/60* (2017.01)
  *G06F 16/48* (2019.01)
  *G06F 16/432* (2019.01)
  *G06T 7/00* (2017.01)

(56) References Cited

U.S. PATENT DOCUMENTS

| | | | |
|---|---|---|---|
| 6,249,616 B1 | 6/2001 | Hashimoto | |
| 7,327,902 B2 | 2/2008 | Ritt et al. | |
| 7,873,238 B2 | 1/2011 | Schultz et al. | |
| 7,945,117 B2 | 5/2011 | Hermosillo et al. | |
| 8,078,436 B2 | 12/2011 | Pershing et al. | |
| 8,081,841 B2 | 12/2011 | Schultz et al. | |
| 8,145,578 B2 | 3/2012 | Pershing et al. | |
| 8,170,840 B2 | 5/2012 | Pershing | |
| 8,207,964 B1 | 6/2012 | Meadow et al. | |
| 8,209,152 B2 | 6/2012 | Pershing | |
| 8,401,222 B2 | 3/2013 | Thornberry et al. | |
| 8,452,125 B2 | 5/2013 | Schultz et al. | |
| 8,515,125 B2 | 8/2013 | Thornberry et al. | |
| 8,531,472 B2 | 9/2013 | Freund et al. | |
| 8,542,880 B2 | 9/2013 | Thornberry et al. | |
| 8,548,248 B2 | 10/2013 | Mitchell et al. | |
| 8,655,070 B1 | 2/2014 | Yang et al. | |
| 8,660,382 B2 | 2/2014 | Schultz et al. | |
| 8,670,961 B2 | 3/2014 | Pershing et al. | |
| 8,731,234 B1 | 5/2014 | Ciarcia et al. | |
| 8,774,525 B2 | 7/2014 | Pershing | |
| 8,818,770 B2 | 8/2014 | Pershing | |
| 8,823,732 B2 | 9/2014 | Adams et al. | |
| 8,825,454 B2 | 9/2014 | Pershing | |
| 8,965,812 B2 | 2/2015 | Linville | |
| 8,977,520 B2 | 3/2015 | Stephens et al. | |
| 8,995,757 B1 | 3/2015 | Ciarcia et al. | |
| 9,117,310 B2 | 8/2015 | Coene et al. | |
| 9,129,376 B2 | 9/2015 | Pershing | |
| 9,135,737 B2 | 9/2015 | Pershing | |
| 9,141,880 B2 | 9/2015 | Ciarcia | |
| 9,141,925 B2 | 9/2015 | Jung et al. | |
| 9,147,287 B2 | 9/2015 | Ciarcia | |
| 9,159,130 B2 | 10/2015 | Kneepkens | |
| 9,159,164 B2 | 10/2015 | Ciarcia | |
| 9,183,538 B2 | 11/2015 | Thornberry et al. | |
| 9,244,589 B2 | 1/2016 | Thornberry et al. | |
| 9,275,496 B2 | 3/2016 | Freund et al. | |
| 9,292,913 B2 | 3/2016 | Schultz et al. | |
| 9,329,749 B2 | 5/2016 | Thornberry et al. | |
| 9,389,084 B1 | 7/2016 | Chen et al. | |
| 9,437,029 B2 | 9/2016 | Schultz et al. | |
| 9,514,568 B2 | 12/2016 | Pershing et al. | |
| 9,520,000 B2 | 12/2016 | Freund et al. | |
| 9,536,148 B2* | 1/2017 | Gross | G06Q 50/16 |
| 9,542,738 B2 | 1/2017 | Schultz et al. | |
| 9,576,201 B2 | 2/2017 | Wu et al. | |
| 9,599,466 B2 | 3/2017 | Pershing | |
| 9,743,046 B2 | 8/2017 | Giuffrida et al. | |
| 9,753,950 B2 | 9/2017 | Schultz et al. | |
| 9,805,489 B2 | 10/2017 | Schultz et al. | |
| 9,836,882 B2 | 12/2017 | Freund et al. | |
| 9,911,042 B1 | 3/2018 | Cardona et al. | |
| 9,911,228 B2 | 3/2018 | Pershing et al. | |
| 9,922,412 B1* | 3/2018 | Freeman | G06Q 50/16 |
| 9,933,254 B2 | 4/2018 | Thornberry et al. | |
| 9,933,257 B2 | 4/2018 | Pershing | |
| 9,959,581 B2 | 5/2018 | Ershing | |
| 9,959,653 B2 | 5/2018 | Schultz et al. | |
| 9,972,126 B2 | 5/2018 | Freund et al. | |
| 10,169,680 B1 | 1/2019 | Sachdeva et al. | |
| 10,197,391 B2 | 2/2019 | Thornberry et al. | |
| 10,229,532 B2 | 3/2019 | Freund et al. | |
| 10,311,302 B2 | 6/2019 | Kottenstette et al. | |
| 10,338,222 B2 | 7/2019 | Schultz et al. | |
| 10,346,935 B2 | 7/2019 | Thornberry et al. | |
| 10,402,676 B2 | 9/2019 | Wang et al. | |
| 10,455,197 B2 | 10/2019 | Giuffrida et al. | |
| 10,489,953 B2 | 11/2019 | Schultz et al. | |
| 10,503,843 B2 | 12/2019 | Keane | |
| 10,515,414 B2 | 12/2019 | Pershing | |
| 10,528,960 B2 | 1/2020 | Pershing et al. | |
| 10,529,029 B2 | 1/2020 | Okazaki | |
| 10,571,575 B2 | 2/2020 | Schultz et al. | |
| 10,573,069 B2 | 2/2020 | Freund et al. | |
| 10,648,800 B2 | 5/2020 | Thornberry et al. | |
| 10,650,285 B1 | 5/2020 | Okazaki | |
| 10,663,294 B2 | 5/2020 | Pershing et al. | |
| 10,685,149 B2 | 6/2020 | Pershing | |
| 10,796,189 B2 | 10/2020 | Wang et al. | |
| 10,839,469 B2 | 11/2020 | Pershing | |
| 10,937,178 B1 | 3/2021 | Srinivasan | |
| 11,651,552 B2* | 5/2023 | Valladolid | G06F 16/41 |
| | | | 345/420 |
| 11,676,298 B1 | 6/2023 | Portail et al. | |
| 2003/0146913 A1 | 8/2003 | Shen et al. | |
| 2005/0084178 A1 | 4/2005 | Lure et al. | |
| 2006/0165267 A1 | 7/2006 | Wyman et al. | |
| 2008/0255862 A1* | 10/2008 | Bailey | G06Q 40/06 |
| | | | 707/999.107 |
| 2010/0014781 A1 | 1/2010 | Liu et al. | |
| 2010/0111428 A1 | 5/2010 | Yu et al. | |
| 2010/0217566 A1 | 8/2010 | Wayne et al. | |
| 2012/0141014 A1 | 6/2012 | Lepikhin et al. | |
| 2013/0054476 A1 | 2/2013 | Whelan | |
| 2013/0121571 A1 | 5/2013 | Gokturk et al. | |
| 2014/0015924 A1 | 1/2014 | Pryor | |
| 2014/0139515 A1 | 5/2014 | Kim et al. | |
| 2014/0180989 A1 | 6/2014 | Krizhevsky et al. | |
| 2015/0088886 A1 | 3/2015 | Brouwer et al. | |
| 2015/0131852 A1 | 5/2015 | Sweetser et al. | |
| 2015/0269598 A1 | 9/2015 | Terrazas et al. | |
| 2015/0286786 A1 | 10/2015 | El-Baz et al. | |
| 2015/0302529 A1* | 10/2015 | Jagannathan | G06Q 40/08 |
| | | | 705/4 |
| 2015/0347872 A1 | 12/2015 | Taylor et al. | |
| 2016/0026900 A1 | 1/2016 | Ando | |
| 2016/0063516 A1* | 3/2016 | Terrazas | G06V 10/56 |
| | | | 705/7.29 |
| 2016/0292800 A1* | 10/2016 | Smith | G06Q 50/16 |
| 2017/0032481 A1* | 2/2017 | D'Souza | G06Q 30/0631 |
| 2017/0270650 A1* | 9/2017 | Howe | G06F 18/24133 |
| 2019/0213412 A1 | 7/2019 | Kottenstette et al. | |
| 2019/0213438 A1 | 7/2019 | Jones et al. | |
| 2019/0294647 A1 | 9/2019 | Brouwer et al. | |
| 2019/0304026 A1* | 10/2019 | Lyman | G06Q 40/08 |
| 2019/0354772 A1 | 11/2019 | Tasli et al. | |
| 2020/0082168 A1 | 3/2020 | Fathi et al. | |
| 2020/0134753 A1* | 4/2020 | Vickers | G06Q 40/08 |
| 2020/0151500 A1 | 5/2020 | Kossyk et al. | |
| 2020/0160030 A1 | 5/2020 | Lavi | |
| 2020/0226373 A1 | 7/2020 | Kottenstette et al. | |
| 2021/0065340 A1 | 3/2021 | El-Khamy et al. | |
| 2021/0089811 A1* | 3/2021 | Strong | G06T 7/0004 |
| 2021/0118165 A1 | 4/2021 | Strong | |
| 2021/0133936 A1 | 5/2021 | Chandra et al. | |
| 2021/0182529 A1 | 6/2021 | Singh et al. | |
| 2021/0188312 A1 | 6/2021 | Shikari et al. | |
| 2021/0199446 A1 | 7/2021 | Marschner et al. | |
| 2021/0312710 A1 | 10/2021 | Fathi et al. | |
| 2022/0012518 A1 | 1/2022 | Sutherland | |
| 2022/0099855 A1 | 3/2022 | Li et al. | |
| 2022/0292650 A1 | 9/2022 | Amirghodsi et al. | |
| 2023/0230220 A1 | 7/2023 | Portail et al. | |
| 2023/0230250 A1 | 7/2023 | Vianello | |

FOREIGN PATENT DOCUMENTS

| | | |
|---|---|---|
| CN | 108629287 A | 10/2018 |
| EP | 3340106 A1 | 6/2018 |
| WO | 2012115594 A1 | 8/2012 |

(56) References Cited

OTHER PUBLICATIONS

Neptune, Nathalie, et al., "Automatic Annotation of Change Detection Images", Sensors, published Feb. 5, 2021.
"Geospatial Property Analytics: Supercharging AVMs for SFR Investing", Cape Analytics, downloaded Oct. 3, 2022, https://capeanalytics.com/blog/geospatial-property-analytics-avm-sfr-investing/.
"ValPro+ —Cape Analytics", Cape Analytics, https://web.archive.org/web/20210301122341/https://capeanalytics.com/valpro/, downloaded Oct. 3, 2022.
"Weiss Analytics Launches ValPro+, First AVM Powered By Cape Analytics' Instant Property Condition Assessments", Cape Analytics, Feb. 19, 2021, https://capeanalytics.com/resources/weiss-analytics-valpro-instant-property-condition-assessments/.
"Cape analytics now detects yard debris from Geospatial imagery", Dec. 18, 2019, pp. 1-4 (Year: 2019).
"CLIP: Connecting Text and Images", https://openai.com/blog/clip/, Jan. 5, 2021.
"The Real Value of Change Detection: A ChangeFinderTM Story Map", https://www.eagleview.com/newsroom/2018/02/real-value-change-detection/, EagleView US, Feb. 28, 2018.
"Unique Building Identifier (UBID)", Office of Energy Efficiency & Renewable Energy, https://www.energy.gov/eere/buildings/unique-building-identifier-ubid#:~ text=UBID, first downloaded Dec. 22, 2022.
Ali, Imtiaz, "Unsupervised video analysis for counting of wood in river during floods", Springer-Verlag, 2009, pp. 578-587 (year: 2009).
Carlberg, Matthew, et al., "Classifying Urban Landscape in Aerial Lidar Using 3D Shape Analysis", IEEE, 978-1-4244-5654-3, 2009, pp. 1701-1704 (Year: 2009).
Chen, Yixing, et al., "development of city—modeling", Energy and Buildings, 2019, pp. 252-265 (Year 2019).
Eigen, David, et al., "Depth Map Prediction from a Single Image using a Multi-Scale Deep Network", Proceedings of Advances in Neural Information Processing Systems (NIPS), Jun. 2014.
Friedland, Carol, et al., "Integrated Aerial-Based and ground Based—Scales", ResearchGate, Feb. 9, 2015, pp. 1-7 (Year 2015).
Jiang, Shasha, et al., "Automatic urban debris zone extraction from post-hurricane very high-resolution satellite and aerial imagery", Geomatics, Natural Hazards and Risk, 7:3, 933-952, https://www.tandfonline.com/doi/full/10.1080/19475705.2014.1003417, 2016.
Kalinicheva, Ekaterina, et al., "Unsupervised Change Detection Analysis in Satellite Image Time Series using Deep Learning Combined with Graph-Based Approaches", https://hal.archives-ouvertes.fr/hal-02749683, Jun. 3, 2020.
Maire, Frederic, et al., "A Convolutional Neural Network for Automatic Analysis of Aerial Imagery", 2014 International Conference on Digital Image Computing: Techniques and Applications (DICTA), 8 pages (2014).
Mansouri, Babak, "Earthquake building damage detection using VHR Satellite data", Case study; Two villages near Sarpol-e Zahab), JSEE, Jul. 29, 2018, pp. 45-55 (Year: 2018).
Moussa, A., et al., "Man-made objects classification from satellite/aerial imagery using neural networks", International Archives of the Photogrammetry, Remote Sensing and Spatial Information Sciences—ISPRS Archives, 4 pages (2010).
Muhs, Sebastian, "Automatic delineation—maps", ELSEVIER, 2016, p. 71-84 (Year: 2016).
Plank, Simon, "Rapid damage—Sentinel", Remote Sensing, May 28, 2014, pp. 4870-4906 (Year 2014).
Radford, Alec, et al., "Learning Transferable Visual Models From Natural Language Supervision", arXiv:2103.00020v1 [cs.CV] Feb. 26, 2021.
Tran, Kieu, "Applying Segmentation and Neural Networks To Detect and Quantify Marine Debris From Aerial w Images Captured By an Unmanned Aerial System and Mobile Device", Aug. 2018, pp. 1-70 (Year 2018).
Yu, Bailang, et al., "Automated derivation—method", Landscape and urban planning, 2020, pp. 210-219 (Year: 2010).
Ambrosch, Philipp, et al., "System and Method for Property Group Analysis", U.S. Appl. No. 18/333,803, filed Jun. 13, 2023.
Cebulski, Sarah, et al., "System and Method for Property Analysis", U.S. Appl. No. 18/303,990, filed Apr. 20, 2023.
Corbin, Matthew, et al., "System and Method for Property Data Management", U.S. Appl. No. 18/104,969, filed Feb. 2, 2023.
Zheng, Chuanxia, et al., "Pluralistic Image Completion", arXiv:1903.04227v2. Apr. 5, 2019.

\* cited by examiner

SYSTEM AND METHOD FOR OBJECT ANALYSIS

CROSS REFERENCE TO RELATED APPLICATIONS

This application claims priority to U.S. Application No. 63/300,736 filed 19 Jan. 2022, which is incorporated herein in its entirety by this reference.

TECHNICAL FIELD

This invention relates generally to the property identification field, and more specifically to a new and useful method and system for property state tracking.

BACKGROUND

Determining reliable property data from images sampled over time can be challenging for several reasons. First, the appearance of a given property changes frequently between different image captures, even though the property itself has not changed. For example, different sun positions in the sky can result in different shadow sizes, shapes, and orientations; vegetation coverage can vary drastically across seasons (e.g., a tree can seasonally obscure parts of the property); and different imaging platforms can have different image spectral properties and image resolutions. Since property measurements are sparse and oftentimes need to be aggregated from different sources or across time, these disparities can result in inaccurate data for a given property, since it is difficult to determine whether a detected visual change is due to data disparity or a change in the underlying property. Second, the property itself can change. For example, the property can be modified (e.g., completion of property extension), removed (e.g., demolition), added, replaced (e.g., replacing the property with a different property), or added over time (e.g., actively under construction). Such structural changes in the property can render previously-determined property data invalid (since the property itself has since changed). Unfortunately, conventional imagery-based methods cannot reliably disambiguate whether divergent property data extracted for a given property was due to changes in the property itself, errors in the measurement (e.g., georeferencing errors), land movements, challenging sampling conditions (e.g., shadows, occlusions, etc.), or other reasons. Furthermore, auxiliary information that could be used to disambiguate these changes, such as permit data, are sparse, unreliable, and oftentimes unavailable.

Thus, there is a need in the property identification field to create a new and useful system and method for property state tracking.

DETAILED DESCRIPTION

The following description of embodiments of the invention is not intended to limit the invention to these embodiments, but rather to enable any person skilled in the art to make and use this invention.

1. Overview

Figure 1:
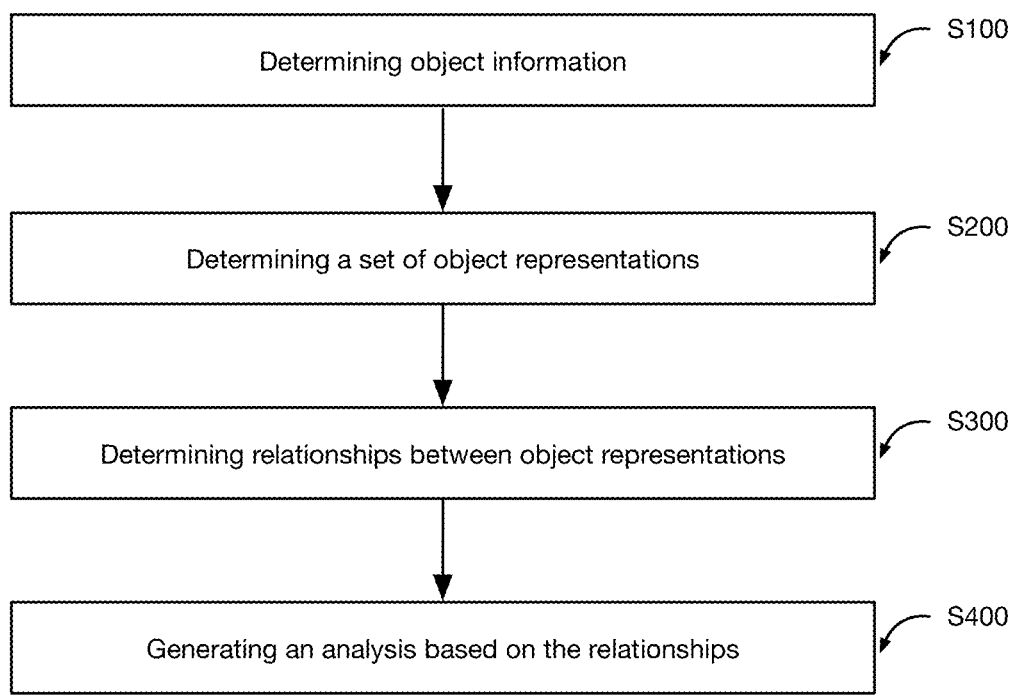
FIG. 1 is a flowchart representation of the method.

As shown in FIG. 1, variants of the method for property identification analysis can include: determining object information S100, determining a set of object representations S200, determining relationships between representations S300, and generating an analysis based on the relationships S400. The method can function to disambiguate between different structural versions of a building and provide a universal identifier for each building version. The method can further provide a timeseries of changes between different building versions.

2. Examples

In an illustrative example, the method can include: determining a timeseries of measurements of a geographic region (e.g., S100); and determining a timeseries of structure versions based on the timeseries of measurements (e.g., S200 and S300), wherein different structure versions can be identified by different structure identifiers (e.g., building identifiers). Examples of the illustrative example are shown in at least FIG. 6A, FIG. 6B, FIG. 12, and FIG. 13. The measurements can be aerial images, depth measurements, and/or other measurements. The geographic region can be a property parcel, a prior structure version's geofence or mask, and/or other region. The timeseries of structure versions can be determined by: extracting a structure representation for a physical structure (e.g., a roof vector, a roof segment, a roof geometry, a building vector, a building segment, etc.) from each measurement of the timeseries; and associating structure representations representing the same structure version with a common structure version (e.g., the same structure identifier). Structure representations representing the same structure version can have the same representation values, have the same structural segments (e.g., physical segments, image segments, geometric segments, etc.), share structural segments, and/or otherwise represent the same structure version. Relationships between different structure versions can also be determined, based on the respective structure representations (e.g., using rules, a classifier, etc.). For example, a modified structure version can have an overlapping set of structural segments with a prior structure version; a replaced structure version can have a disjoint set of structural segments with a prior structure version; an added structure version can have a new set of structural segments when a prior structure version had none; and a removed structure version can have no structural segments when a prior structure version had structure segments. Auxiliary information for each structure version—such as measurements, permit data, descriptions, attributes (e.g., determined from the measurements), and/or other information—can also be associated with the respective structure version (e.g., with the structure identifier) using a set of spatiotemporal rules, or be otherwise associated. In variants, the timeseries of building versions and associated relationships can be represented by a graph (e.g., spatiotemporal graph), where the graph nodes can represent building versions and the edges can represent the relationships.

In use, information associated with a given structure version can be returned responsive to a request identifying the structure version. Information can include: a set of changes (e.g., relationships) between the identified structure version and another structure version (e.g., a current structure version), information from the structure version's timeframe (e.g., auxiliary information, information extracted from measurements of the geographic region sampled during the timeframe, structure segments, etc.), and/or other information.

However, the method can be otherwise performed.

3. Technical Advantages

Variants of the technology for property identification analysis can confer several benefits over conventional systems and benefits.

First, variants of the technology can associate information for a physical object variant (e.g., object instance) with a singular, universal object identifier. This can enable the system to track and return object information for different variants of the "same" object, and can enable the system to identify when the physical object has changed. For example, the system can automatically distinguish between and treat the original and remodeled version of a property as two different property variants, and associate information for each property version with the respective property version.

Second, variants of the technology can enable information from different measurement modalities, different measurement vendors, and/or different measurement times to be merged with an object identifier for a single (physical) object instance.

Third, variants of the technology can extract object representations (e.g., structure representations) that are agnostic to vendor differences, common changes (e.g., occlusions; shadows; roof appearance (e.g., additional/removal of solar panels, roof covering replacement; etc.), measurement registration errors or changes (e.g., due to seismic shift), and other inter-measurement differences, which humans can have difficulty distinguishing. For example, the technology can use a neural network model that is trained using self-supervised learning to generate the same representation for the same physical property instance, despite slight changes in the visual appearance of the property represented in the measurements (e.g., the model is agnostic to appearance-based changes, but is sensitive to geometric changes and/or structural changes).

Fourth, variants of the technology can use the object representations to determine the type of change. For example, the technology can use a neural network model that is trained to identify roof facets from the measurement. A first and second object structure detected in a first and second measurement, respectively, can be considered the same building when the first and second measurement share roof facets.

Fifth, variants of the technology can minimize the number of measurement pairs to analyze, thereby increasing the computational efficiency of the method, by limiting the object representation comparisons to those located within and/or overlapping a common geographic region (e.g., property parcel). For example, objects from different measurements of the same property parcel or geographic region can be assumed to have a high probability of being the same, so representation comparisons can be limited to those of objects extracted from measurements of the same property parcel (or geographic region).

However, the technology can confer any other suitable benefits.

4. Method

The method can include: determining object information S100, determining a set of object representations S200, determining relationships between object representations S300, and optionally generating an analysis based on the relationships S400. However, the method can additionally and/or alternatively include any other suitable elements.

One or more variations of the system and/or method can omit one or more of the above elements and/or include a plurality of one or more of the above elements in any suitable order or arrangement. One or more instances of the method can be repeated for different properties, different timeframes, and/or otherwise repeated.

The method functions to associate information (e.g., measurements, representations, extracted features, auxiliary information, etc.) for the same physical object version with a common object identifier. The method can optionally function to segregate information for different object versions. In variants, the method can also determine a timeseries of object versions for the objects within a given geographic region.

The objects are preferably physical objects, but can be any other object. The objects can be: structures (e.g., built structures, such as buildings, etc.), a portion of a structure (e.g., a building component, a roof, a wall, etc.), vegetation, manmade artifacts (e.g., pavement, driveways, roads, lakes, pools, etc.), and/or be any other suitable physical object. The objects are preferably static (e.g., immobile relative to the ground or other mounting surface), but can alternatively be partially or entirely mobile.

Object versions 40 (e.g., examples shown in FIG. 4 and FIG. 12) are preferably distinguished by different physical geometries (e.g., internal geometries, external geometries, etc.), but can alternatively be distinguished by different appearances and/or otherwise distinguished. For example, different building versions can have different sets of building segments (e.g., different roof segments), different building material (e.g., tile vs shingle roofing), and/or be otherwise distinguished. Conversely, the same building version can have the same set of building segments, building material, and/or other parameters.

Each object version 40 can be identified by a singular, universal object identifier. Alternatively, each object version can be identified by multiple object identifiers. Each object identifier preferably identifies a single object version, but can alternatively identify multiple object versions (e.g., identify an object geographic region, wherein different object versions can be distinguished by different timeframes). The object identifier can be a sequence of characters, a vector, a token, a mask, and/or any other suitable object identifier. The object identifier can include or be derived from: the geographic region (e.g., an address, lot number, parcel number, geolocation, geofence, etc.), a time stamp (e.g., of the first known instance of the object version), a timeframe (e.g., of the object version), the object representation associated with the object version (e.g., a hash of the object representation, the object representation itself, etc.), an index (e.g., version number for the geographic region), a random set of alphanumeric characters (e.g., a set of random words, etc.), an object version within a series of related object versions, and/or any other suitable information. For example, the object identifier can include or be determined from a parcel number or address and a timestamp of the first measurement depicting the respective object version.

The method can be performed: in response to a request (e.g., an API request) from an endpoint, before receipt of a request, when new measurements are received, at a predetermined frequency, and/or any other suitable time. The method can be performed once, iteratively, responsive to occurrence of a predetermined event, and/or at any other time. In a first variant, an instance of the method is performed using all available object information (e.g., measurements) for a given geographic region 10, wherein object representations are extracted from each piece of available object information and compared against each other to distinguish object versions. In a second variant, an instance of the method is performed using a specific set of object information (e.g., new object information, object information from a certain timeframe, etc.), wherein the object representation is extracted from the set of object information and compared against other object representations for the geographic region 10 that were determined using prior instances of the method to determine whether the object representation represents a known object version or a new object version. However, the method can be performed at any time, using any other suitable set of object information.

The method can be performed for all objects within an object set (e.g., all properties appearing in a map, within a geographic region, within a large-scale measurement, etc.), a single object (e.g., a requested building, a requested parcel), a geographic region, a timeframe, and/or any other suitable set of objects.

The method can be performed for one or more geographic regions 10 (e.g., examples shown in FIG. 3, FIG. 6A, and FIG. 6B), wherein object representations for objects within and/or encompassing the geographic region 10 are extracted and analyzed from object information depicting or associated with the geographic region to determine whether the object has changed over time. The geographic region 10 can be: a real estate parcel, the geographic footprint of an object version detected in a different piece of object information (e.g., measurement), a region surrounding the geographic footprint, a municipal region (e.g., neighborhood, zip code, city, state, etc.), a geographic region depicted within a measurement, and/or any other suitable geographic region. In a first variant, the geographic region includes the geofence for a detected or known object. In a second variant, the geographic region includes the geolocations within the geofence. In a third variant, the geographic region includes a property parcel. In this variant, the analyzed object representations can be limited to those for an object of interest (e.g., having a predetermined object class). In a fourth variant, the geographic region includes a large region (e.g., property parcel, neighborhood, municipal district, etc.). In this variant, object representations for a plurality of objects can be extracted from object information from different times, wherein temporally distinct object representations that are associated with overlapping geographic subregions are analyzed (e.g., compared). However, any other suitable geographic region can be used.

The method is preferably performed by a remote system (e.g., platform, cloud platform, etc.), but can additionally and/or alternatively be performed by a local system or be performed by any other suitable system. The remote system can include a set of processing systems (e.g., configured to execute all or portions of the method, the models, etc.), storage (e.g., configured to store the object representations, object versions, data associated with the object versions, etc.), and/or any other suitable component.

The method can be performed using one or more models. The model(s) can include: a neural network (e.g., CNN, DNN, encoder, etc.), a visual transformer, a combination thereof, an object detector (e.g., classical methods, CNN based algorithms, such as Region-CNN, fast RCNN, faster R-CNN, YOLO, SSD-Single Shot MultiBox Detector, R-FCN, etc.; feed forward networks, transformer networks, generative algorithms, diffusion models, GANs, etc.), a segmentation model (e.g., semantic segmentation model, instance-based semantic segmentation model, etc.), leverage regression, classification, rules, heuristics, equations (e.g., weighted equations), instance-based methods (e.g., nearest neighbor), decision trees, support vectors, geometric inpainting, Bayesian methods (e.g., Naïve Bayes, Markov, etc.), kernel methods, statistical methods (e.g., probability), deterministics, clustering, and/or include any other suitable model or algorithm. Each model can determine (e.g., predict, infer, calculate, etc.) an output based on: one or more measurements depicting the object, tabular data (e.g., attribute values, auxiliary data), other object information, and/or other information. The model(s) can be specific to an object class (e.g., roof, tree, pool), a sensing modality (e.g., the model is specific to accepting an RGB satellite image as the input), and/or be otherwise specified. One model can be used to extract different representations of the set, but additionally and/or alternatively multiple different models can be used to extract different representations of the set.

Examples of models that can be used include one or more: object representation models, object detectors, object segmentation models, relationship models, and/or other models.

The object representation model functions to extract a representation of the object depicted or described within the object information. The object representation model preferably extracts the object representation from a single piece of object information (e.g., a single image, etc.), but can alternatively extract the object representation from multiple pieces of object information. The object representation model can include a single model (e.g., a CNN, an object detector, an object segmentation model, etc.), a set of submodels (e.g., each configured to extract a different attribute value from the object information), and/or be otherwise configured.

In a first variant, the object representation model can be an object segmentation model that extracts a segment (e.g., semantic segment, instance-based segment, etc.) of an object of interest (e.g., object class of interest) from a measurement (e.g., an image, a DSM, etc.).

In a second variant, the object representation model can include a set of attribute models, each configured to extract a value for the respective attribute from the object information (e.g., contemporaneous object information, same piece of object information, etc.). Examples of attribute models can include those described in U.S. application Ser. No.

17/475,523 filed 15 Sep. 2021, U.S. application Ser. No. 17/526,769 filed 15 Nov. 2021, U.S. application Ser. No. 17/749,385 filed 20 May 2022, U.S. application Ser. No. 17/870,279 filed 21 Jul. 2022, U.S. application Ser. No. 17/858,422 filed 6 Jul. 2022, U.S. application Ser. No. 17/981,903 filed 7 Nov. 2022, U.S. application Ser. No. 17/968,662 filed 18 Oct. 2022, U.S. application Ser. No. 17/841,981 filed 16 Jun. 2022, and/or U.S. application Ser. No. 18/074,295 filed 2 Dec. 2022, each of which is incorporated herein in its entirety by this reference. However, other attribute models can be used.

In a third variant, the object representation model can be a model (e.g., CNN, encoder, autoencoder, etc.) trained to output the same object representation (e.g., feature vector) for the same object version despite common appearance changes in the object measurement (e.g., be agnostic to appearance-based changes but sensitive to geometric changes). Common appearance changes can include: shadows, occlusions (e.g., vegetation cover, snow cover, cloud cover, aerial object cover, such as birds or planes, etc.), registration errors, and/or other changes. This object representation model preferably extracts the object representation from an appearance measurement (e.g., an image), but can alternatively extract the object representation from a geometric measurement (e.g., DSM, point cloud, mesh, etc.), geometric representation (e.g., model), and/or from any other suitable object information. In this variant, the object representation model can be trained to extract the same object representation (e.g., feature vector) for all instances of an object within a geographic region (e.g., the same parcel, the same geofence, the object segment's geographic footprint, etc.) from object information from different timeframes (e.g., images from different years, times of the year, etc.) (e.g., example shown in FIG. 5). Even though the training data set might include objects that have changed geometric configurations (e.g., different object versions) and therefore should have resulted in different object representations, these changes are relatively rare, and in variants, do not negatively impact the accuracy of the model given a large enough training set. Alternatively, this object representation model can be trained to predict the same object representation (e.g., feature vector) using only object information that is known to describe the same object version.

In a fourth variant, the object representation model can be a feature extractor. The feature extractor can be: a set of upstream layers from a classifier (e.g., trained to classify and/or detect the object class from the object information), an encoder, a classical method, and/or any other suitable feature extractor. Examples of feature extractors and/or methodologies that can be used include: corner detectors, SIFT, SURF, FAST, BRIEF, ORB, deep learning feature extraction techniques, and/or other feature extractors.

However, the object representation model can be otherwise configured.

The object detectors can detect the objects of interest (e.g., object classes of interest) within the object information (e.g., object measurement, DSM, point cloud, image, wide-area image, etc.). Each object detector is preferably specific to a given object class (e.g., roof, solar panel, driveway, chimney, HVAC system, etc.), but can alternatively detect multiple object classes. Example object detectors that can be used include: Viola Jones, Scale-invariant feature transform (SIFT), Histogram of oriented gradients (HOG), region proposals (e.g., R-CNN), Single Shot MultiBox Detector (SSD), You Only Look Once (YOLO), Single-Shot Refinement Neural Network for Object Detection (RefineDet), Retina-Net, deformable convolutional networks, zero-shot object detectors, transformer-based networks (e.g., Detection Transformer (DETR), and/or any other suitable object detector.

An object detector can: detect the presence of an object of interest (e.g., an object class) within the measurement, determine a centroid of the object of interest, determine a count of the object of interest within the measurement, determine a bounding box surrounding the object (e.g., encompassing or touching the furthest extents of the object, aligned with or parallel the object axes, not aligned with the object axis, be a rotated bounding box, be a minimum rotated rectangle, etc.), determine an object segment (e.g., also function as a segmentation model), determine object parameters, determine a class for the object, and/or provide any other suitable output, given a measurement of the object or geographic region (e.g., an image). Examples of object parameters can include: the location of the object (e.g., location of the object within the image, the object's geolocation, etc.; from the bounding box location); the geographic extent of the object (e.g., extent of the bounding box); the orientation of the object (e.g., within the image, within a global reference frame, relative to cardinal directions, relative to another object, etc.; from the bounding box orientation); the dimensions of the object (e.g., from the dimensions of the bounding box), and/or other parameters. The object detector can additionally or alternatively be trained to output object geometries, time of day (e.g., based on shadow cues), and/or any other suitable information.

Figure 15:
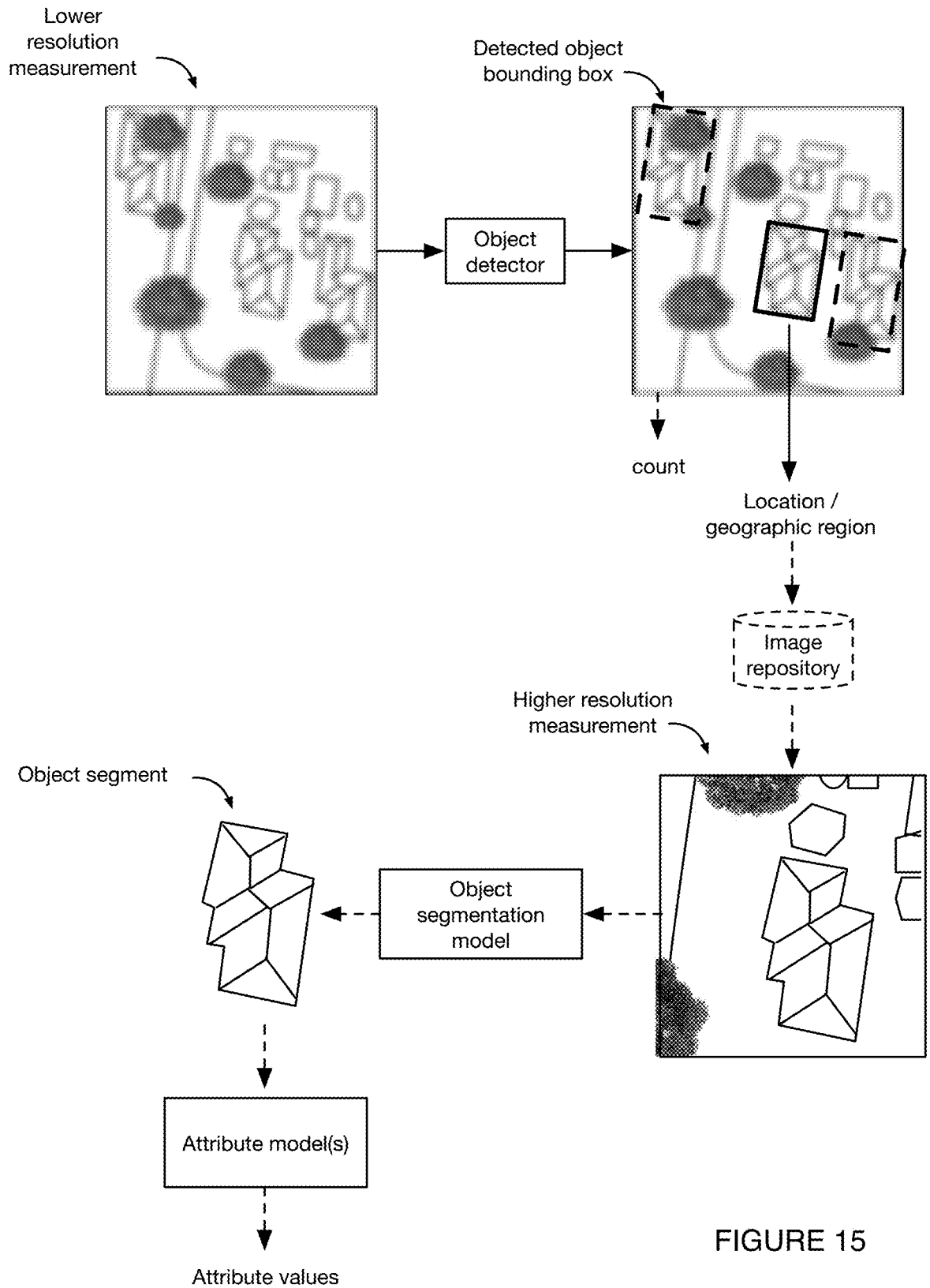
FIG. 15 is an illustrative example of using an object detector.

The object detector can be trained based on manual labels (e.g., manually drawn bounding boxes), bounding boxes drawn around object segments (e.g., determined using a segmentation model from measurements of the same resolution, higher resolution, or lower resolution), bounding boxes drawn around object geofences or masks (e.g., determined from the locations of the object segments), and/or other training targets. Alternatively, the object detector (e.g., a zero-shot object detector) can be generated using a zero-shot classification architecture adapted for object detection (e.g., by embedding both images and class labels into a common vector space; by using multimodal semantic embeddings and fully supervised object detection; etc.), and/or otherwise generated. The detected object, parameters thereof (e.g., location, orientation, bounding box size, object class, etc.), and/or derivatory entities (e.g., object segments) can be used to: retrieve higher-resolution measurements of the region (e.g., higher resolution than that used to detect the object; example shown in FIG. 15); retrieve a different measurement modality for the region (e.g., depth measurements for the region); be used to determine the pose of the object; be used to determine attribute values for the object; be used to determine a geometric parameter of the object (e.g., the detected building shadow's length can be used to determine a building's height, given the building's geolocation and the measurement's sampling time); be used for multi-category multi-instance localization; determine counts and/or other population analyses; for time-series analyses (e.g., based on objects detected from a timeseries of measurements); and/or be otherwise used. The higher-resolution measurements can encompass the detected object's location, encompass the bounding box's geographic region, encompass a smaller region than the wide-area measurement, and/or be otherwise related to the detected object. In variants, the higher-resolution measurement can be used to extract a higher-accuracy object segment using a segmentation model (e.g., a more accurate segment than that extractable from the original measurement; example shown in FIG. 15) and/or be otherwise used. In these variants, the bounding box can optionally be used to crop or mask the higher-resolution image before object segmentation or not be used for segmentation. The object segment and/or object detection (e.g., bounding box; measurement portion within the bounding box, etc.) can then be used to determine object attributes, feature vectors, and/or otherwise used. However, the object detector can be otherwise configured, and the outputs otherwise used.

The object segmentation models can determine the pixels corresponding to an object of interest (e.g., object class of interest). The object segmentation models can be preferably specific to a given object class (e.g., roof, solar panel, driveway, etc.), but can alternatively segment multiple object classes. The object segmentation model can be a semantic segmentation model (e.g., label each pixel with an object class label or no object label), instance-based segmentation model (e.g., distinguish between different instances of the same object class within the measurement), and/or be any other suitable model. The object segmentation model is preferably trained to determine object representations (e.g., masks, pixel labels, blob labels, etc.) from object measurements, but can alternatively determine the object representations from other object information. In variants, the object measurements used by the object segmentation model can be higher resolution and/or depict a smaller geographic region than those used by the object detector; alternatively, they can be the same, lower resolution, and/or depict a larger geographic region.

The relationship model functions to determine the type of relationship between two object versions and/or object representations. In a first variant, the relationship model can be a classifier (e.g., change classifier) trained to determine (e.g., predict, infer) a relationship (e.g., change) between two object variants and/or object representations, given the object representations. In a second variant, the relationship model can be a ruleset or set of heuristics. In an example, the relationship model can associate object representations with object versions based on a comparison of the geometric segments represented by the object representations. In a second example, the relationship model can associate information (e.g., auxiliary information) with an object version when that information (e.g., auxiliary information) is also associated with the same geographic region and the same timeframe as the object version. In a third variant, the relationship model can be a similarity model configured to determine a distance between two object representations. However, the relationship model can be otherwise configured.

However, any other suitable set of models can be used.

4.1 Determining Object Information S100.

Determining object information S100 functions to determine information that is representative of an object version.

The object information 20 (e.g., examples shown in FIG. 2, FIG. 4, FIG. 12, and FIG. 13) is preferably for a geographic region 10 associated with an object of interest, but can additionally or alternatively be for an image segment, geometric segment, and/or any other suitable entity. The geographic region associated with the object of interest can be a parcel, lot, geofence (e.g., of a prior version of the object), neighborhood, geocode (e.g., associated with an address), or other geographic region.

In an illustrative example, S100 can retrieve imagery (e.g., aerial imagery) depicting the geographic region associated with an address (e.g., depicting the respective parcel, encompassing a geocode associated with the address, etc.). However, S100 can retrieve any other suitable object information.

The determined object information can include one or more pieces of object information. For example, the object information can include: a single measurement (e.g., image), multiple measurements, measurements and attribute values, attribute values and descriptions, all available object information (e.g., for the geographic region, for the timeframe), and/or any other suitable set of object information.

The determined object information can be for one or more time windows (e.g., timeframes). The determined object information can include: all information associated with the geographic region, only new information available since the last analysis of the object version and/or the geographic region, the most recent information (e.g., for the geographic region), only information within a predetermined time window (e.g., within a request-specified time window or timeframe, from the last analysis until a current time, etc.), and/or any other suitable object information. In variants, limiting the object information by time window can enable object representations to be determined for each time window, which enables the resultant object representations to be compared (and tracked) across different time windows. Alternatively or additionally, the determined object information can be unlimited by time.

The object information 20 can be determined: responsive to receipt of a request (e.g., identifying the object identifier, identifying the geographic region, etc.), when new information is available, periodically, at a predetermined time, and/or at any other suitable time. In a first example, object information for a geographic region can be retrieved in response to receipt of a request including an object identifier associated with the geographic region, wherein the retrieved object information can be for the object version associated with the object identifier and/or for other object versions associated with the geographic region. In a second example, all object information for a geographic region can be periodically retrieved. However, the object information can be determined at any other time.

Figure 2:
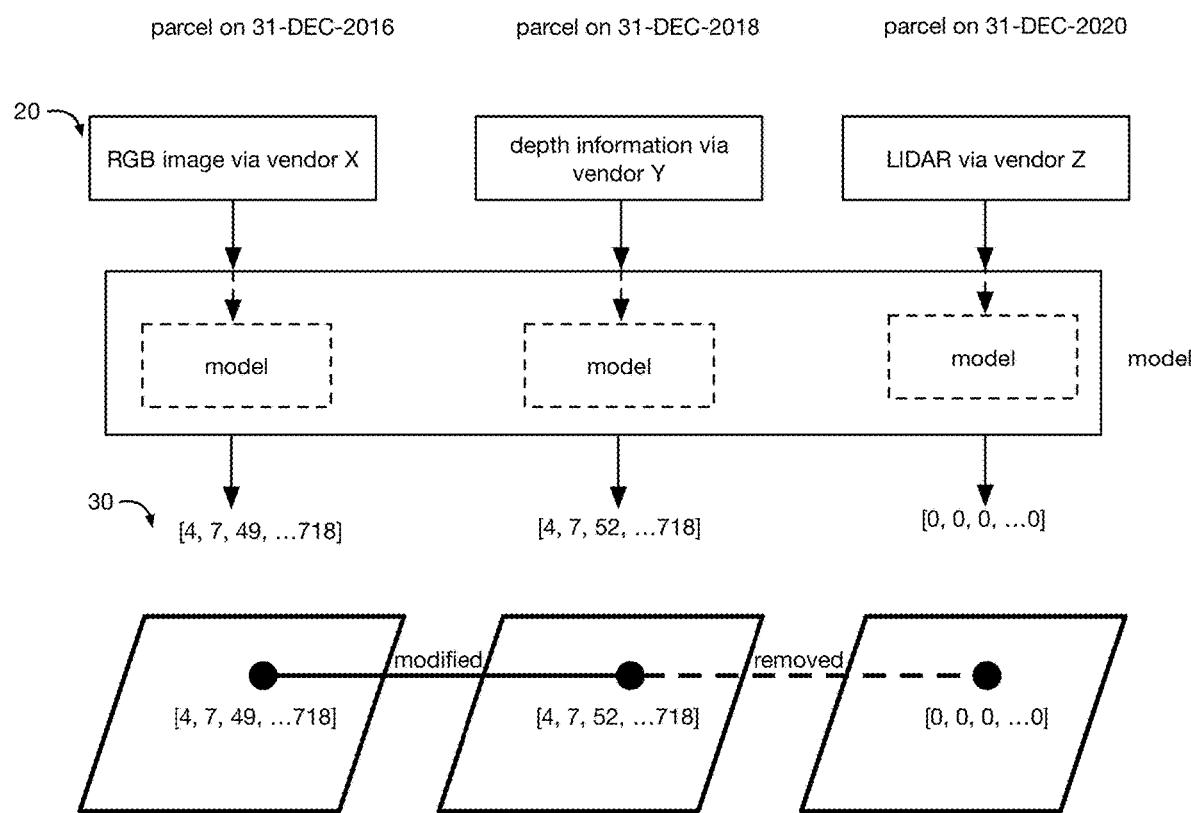
FIG. 2 is an illustrative example of a graph.

The object information 20 can be from the same information provider (e.g., vendor), but can additionally and/or alternatively be from different information providers; example shown in FIG. 2. The information determined for different object versions preferably has the same information modality (e.g., RGB, LIDAR, stereovision, radar, sonar, text, audio, etc.), but can additionally and/or alternatively have different information modalities. The information can be associated with the same information time (e.g., time the image was captured of the object), but can additionally and/or alternatively be associated with different information times. The information can be associated with the same geographic region (e.g., parcel, lot, address, geofence, etc.), or be associated with different geographic regions.

Each piece of object information 20 can be associated with geographic information (e.g., a geolocation, an address, a property identifier, etc.), a timeframe (e.g., a timestamp, a year, a month, a date, etc.), information provider, pose relative to the object or geographic region, and/or other metadata.

The object information 20 can include: measurements, models (e.g., geometric models), descriptions (e.g., text descriptions, audio descriptions, etc.), attribute values (e.g., determined from the measurements or descriptions, etc.), auxiliary data, and/or other information. The same type of object information is preferably determined for each object version and/or method instance; alternatively, different object information types can be determined.

Each measurement is preferably an image (e.g., RGB, NDVI, etc.), but can additionally and/or alternatively be depth information (e.g., digital elevation model (DEM), digital surface model (DSM), digital terrain model (DTM), etc.), polygons, point clouds (e.g., from LIDAR, stereoscopic analyses, correlated images sampled from different poses, etc.), radar, sonar, virtual models, audio, video, and/or any other suitable measurement. The image can include tiles (e.g., of geographic regions), chips (e.g., depicting a parcel, depicting the portion of a geographic region associated with a built structure), parcel segments (e.g., of a property parcel), and/or any other suitable image segments. Each measurement can be geometrically corrected (e.g., orthophoto, orthophotograph, orthoimage, etc.) such that the scale is uniform (e.g., image follows a map projection), but can alternatively not be geometrically corrected. Each measurement preferably depicts a top-down view of the object, but can additionally and/or alternatively depict an oblique view of the object, an orthographic view of the object, and/or any other suitable view of the object. Each measurement is preferably remotely sensed (e.g., satellite imagery, aerial imagery, drone imagery, radar, sonar, LIDAR, seismography, etc.), but can additionally and/or alternatively be locally sensed or otherwise sensed. The measurements can be of the object exterior, interior, and/or any other suitable view of the property.

Figure 3:
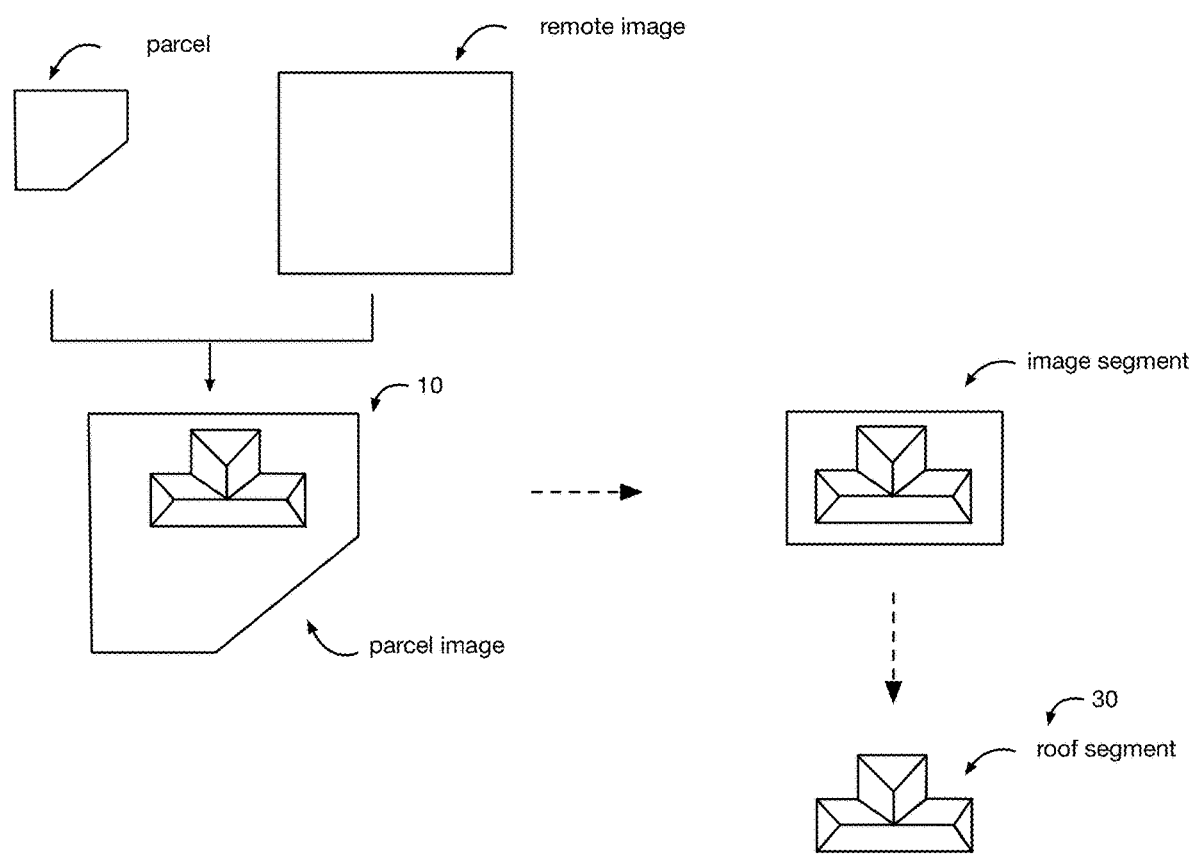
FIG. 3 is an illustrative example of determining polygons for a structure.

For example, measurements can be: wide-area images, parcel segments (e.g., image segment depicting a parcel), object segments (e.g., image segment depicting a structure of interest; example shown in FIG. 3), and/or any other suitable measurement. The image segments can be cropped to only include the entity of interest (e.g., parcel, structure, etc.), or include surrounding pixels.

The measurements of the set are preferably measurements of the same geographic region (e.g., property, parcel, etc.), but can alternatively be representative of different geographic regions. The property can be: a property parcel, an object, a point of interest, a geographic region, and/or any other suitable entity.

Additionally or alternatively, the measurements of the set can be associated with (e.g., depict) the same physical object instance (e.g., the tracked object instance) or different object instances. The object can include: a built structure (e.g., building, deck, pool, etc.), a segment of a built structure (e.g., roof, solar panel, door, etc.), feature of a built structure (e.g., shadow), vegetation, a landmark, and/or any other physical object.

The measurements and/or portions thereof can optionally be pre- or post-processed. In a first example, a neural network model can be trained to identify an object of interest (e.g., an object segment) within a measurement (e.g., image, geometric measurement, etc.), wherein occluded segments of the object of interest can be subsequently infilled by the same or different model. The occluded segments can be infilled using the method disclosed in U.S. application Ser. No. 17/870,279 filed 21 Jul. 2022, incorporated herein in its entirety by this reference, and/or using any other suitable method. In a second example, errant depth information can be removed from a depth measurement. In an illustrative example, this can include removing depth information below a ground height and/or removing depth information above a known object height, wherein the known object height can be obtained from building records, prior measurements, or other sources.

However, any other suitable object measurement can be determined.

The attribute values (e.g., property attribute values, object attribute values, etc.) can represent an attribute of the object version. Examples of object attributes can include: appearance descriptors (e.g., color, size, shape, texture, etc.), geometric descriptors (e.g., dimensions, slope, shape, complexity, surface area, etc.), condition descriptors (e.g., yard condition, roof condition, etc.), construction descriptors (e.g., roofing material, flooring material, siding material, etc.), record attributes (e.g., construction year, number of beds/baths, structure classification, etc.), classification attributes (e.g., object class, object type), and/or other descriptors. The object attributes can be quantitative, qualitative, and/or otherwise valued. The object attributes can be determined from object measurements, descriptions, auxiliary information, and/or other information. The object attributes can be determined: manually, using a trained model (e.g., trained to predict or infer the attribute value based on the object information), from a third party database, and/or otherwise determined. In examples, property attributes and/or values thereof can defined and/or determined as disclosed in U.S. application Ser. No. 17/529,836 filed on 18 Nov. 2021, U.S. application Ser. No. 17/475,523 filed 15 Sep. 2021, U.S. application Ser. No. 17/749,385 filed 20 May 2022, U.S. application Ser. No. 17/870,279 filed 21 Jul. 2022, and/or U.S. application Ser. No. 17/858,422 filed 6 Jul. 2022, each of which is incorporated in its entirety by this reference (e.g., wherein features and/or feature values disclosed in the references can correspond to attributes and/or attribute values). The attribute values can be determined asynchronously with method execution, or be determined in real- or near-real time with respect to the method.

Example attributes can include: structural attributes (e.g., for a primary structure, accessory structure, neighboring structure, etc.), record attributes (e.g., number of bed/bath, construction year, square footage, legal class, legal subclass, geographic location, etc.), condition attributes (e.g., yard condition, yard debris, roof condition, pool condition, paved surface condition, etc.), semantic attributes (e.g., semantic descriptors), location (e.g., parcel centroid, structure centroid, roof centroid, etc.), property type (e.g., single family, lease, vacant land, multifamily, duplex, etc.), property component parameters (e.g., area, enclosure, presence, structure type, count, material, construction type, area condition, spacing, relative and/or global location, distance to another component or other reference point, density, geometric parameters, condition, complexity, etc.; for pools, porches, decks, patios, fencing, etc.), storage (e.g., presence of a garage, carport, etc.), permanent or semi-permanent improvements (e.g., solar panel presence, count, type, arrangement, and/or other solar panel parameters; HVAC presence, count, footprint, type, location, and/or other parameters; etc.), temporary improvement parameters (e.g., presence, area, location, etc. of trampolines, playsets, etc.), pavement parameters (e.g., paved area, percent illuminated, paved surface condition, etc.), foundation elevation, terrain parameters (e.g., parcel slope, surrounding terrain information, etc.), legal class (e.g., residential, mixed-use, commercial), legal subclass (e.g., single-family vs. multi-family, apartment vs. condominium), geographic location (e.g., neighborhood, zip, etc.), population class (e.g., suburban, urban, rural, etc.), school district, orientation (e.g., side of street, cardinal direction, etc.), subjective attributes (e.g., curb appeal, viewshed, etc.), built structure values (e.g., roof slope, roof rating, roof condition, roof material, roof footprint, roof surface area, covering material, number of roof facets, roof type, roof geometry, roof segments, etc.), auxiliary structures (e.g., a pool, a statue, ADU, etc.), risk scores (e.g., score indicating risk of flooding, hail, fire, wind, wildfire, etc.), neighboring property values (e.g., distance to neighbor, structure density, structure count, etc.), context (e.g., hazard context, geographic context, weather context, terrain context, etc.), vegetation parameters (e.g., vegetation type, vegetation density, etc.), historical construction information, historical transaction information (e.g., list price, sale price, spread, transaction frequency, transaction trends, etc.), semantic information, and/or any other attribute.

Auxiliary data can include property descriptions, permit data, insurance loss data, inspection data, appraisal data, broker price opinion data, property valuations, property attribute and/or component data (e.g., values), and/or any other suitable data.

The object information can be: retrieved, extracted, and/or otherwise determined.

In a first variant, the set of measurements can be determined by retrieving the set of measurements from a database.

In a second variant, the set of measurements can be manually determined.

In a third variant, the set of measurements can be determined by segmenting the set of measurements from a wide-area measurement (e.g., representative of multiple properties). The set of measurements are preferably determined based on parcel data, but can alternatively be determined independent of parcel data.

In a first example of the third variant, the set of measurements can be segmented from a wide-area measurement by determining a parcel segment within the wide-area image based on a parcel boundary. In this example, object segments (e.g., representative of objects, roof, pool, etc.) can further be determined from the parcel segment using a segmentation model (e.g., semantic segmentation model, instance-based segmentation model, etc.).

In a second example of the third variant, the set of measurements can be segmented from a wide-area measurement by detecting objects within a wide-area image (e.g., using an object detector). The object detections can optionally be assigned to parcels based on the object's geolocation(s).

In other examples of the third variant, the set of measurements can be segmented from a wide-area measurement as discussed in U.S. application Ser. No. 17/336,134 filed 1 Jun. 2021, which is incorporated in its entirety by this reference.

However, the set of measurements can be otherwise determined.

4.2 Determining a Set of Object Representations S200.

Determining a set of object representations S200 functions to determine object representations for an object of interest or a geographic region.

The set of object representations 30 is preferably determined (e.g., extracted) from the object information determined in S100, but can alternatively be determined from other information. The object information can be of the same or different type (e.g., modality), from the same or different vendor, from the same or different time window, from the same or different geographic region (e.g., wherein the different geographic regions overlap or are disjoint), and/or be otherwise related. The set of object representations are preferably determined from a set of measurements, but can additionally and/or alternatively be determined from a description, a set of attribute values, and/or any other suitable object information.

One object representation 30 (e.g., a geometric representation) is preferably determined from each piece of object information (e.g., measurement) of the set, but alternatively multiple representations can be determined from each piece of object information (e.g., different representation types for the same object, such as a geometric representation and a visual representation for the same object; different representations for different objects depicted within the same measurement; etc.), one representation can be determined from multiple pieces of information (e.g., measurements) of the set, and/or any other suitable set of representations can be determined from any suitable number of object information pieces (e.g., measurements).

The object representation 30 (e.g., representation) can represent: an object class of interest within a geographic region, an object instance of interest (e.g., an object version), and/or any other suitable object. The geographic region can be the same or different from that used in S100 to determine the object information. In a first example, S200 can include determining object representations for all buildings or roofs depicted within a measurement (e.g., image or an image segment) depicting a given geographic region (e.g., a real estate parcel, a region surrounding the geographic footprint of an object detected in a prior measurement, etc.). In a second example, S200 can include determining the object representation for a specific building or roof depicted within the measurement. However, any other suitable set of object representations can be determined for a given object instance or geographic region.

Examples of object representations 30 that can be determined can include: an appearance representation (e.g., representative of an object's visual appearance), a geometric representation (e.g., representative of an object's geometry), an attribute representation (e.g., representative of the object's attribute values), a combination thereof, and/or any other suitable representation. Examples of appearance representations can include: vectors (e.g., encoding values for different visual features or appearance-based features), matrices, object segments (e.g., measurement segments depicting substantially only the object, image segments, masks, etc.), bounding boxes encompassing the object, and/or other appearance-based representations. Examples of geometric representations can include: a geometric object segment (e.g., segment of a DSM, segment of a point cloud, masks, etc.), a bounding box (e.g., bounding box, bounding volume, etc.) encompassing the object, a mesh, vectors (e.g., encoding values for different geometric features), a set of geometric feature values (e.g., a set of planes, facets, points, edges, corners, peaks, valleys, etc.) and/or parameters thereof (e.g., count, position, orientation, dimensions, etc.), an array, a matrix, a map, polygons or measurement segments (e.g., example shown in FIG. 3), a model, and/or other geometric representations. Examples of attribute representations can include a vector of values for one or more attributes, and/or be otherwise represented. The attribute values for a given attribute representation are preferably determined from the same pieces of object information (e.g., the same measurements), but can additionally or alternatively be determined from contemporaneous object information and/or other information.

The type of object representations that are determined in S200 can be: predetermined, determined based on the type of measurement (e.g., geometric representations are extracted from Lidar, RGB images, and DSM data, while appearance representations are extracted from RGB images), and/or otherwise determined. The same type of representation is preferably determined for each time window for a given geographic region, such that the representations can be compared against each other; alternatively, different representation types can be determined for each time window for a given geographic region.

The representations 30 of the set are preferably representative of the same object, but can additionally and/or alternatively be representative of different objects. The representations can be for the same or different object versions. The representations are preferably unassociated with an object identifier when the representations are initially determined (e.g., wherein the representation is associated with the object identifier in S300), but can alternatively be associated with an object identifier by default (e.g., associated with the last object identifier for the property by default, wherein S300 evaluates whether the object identifier is the correct object identifier).

Object representations 30 can additionally and/or alternatively be associated with the metadata for the object information, such as the timestamp, vendor, geolocation, and/or other metadata. In variants where object representations are determined from a timeseries of object information (e.g., measurements), S200 can generate a timeseries of object representations.

Object representations 30 can additionally and/or alternatively be associated with: parcel information (e.g., parcel ID, parcel boundaries, parcel geolocation(s), associated addresses, etc.), attribute values extracted from or associated with the object information (e.g., attribute values extracted from the object information, etc.), auxiliary information (e.g., associated with the representation via the parcel, tax information, permit data, address information, square footage, number of beds and baths, etc.), and/or any other suitable auxiliary data. The auxiliary data can be associated with a representation: spatially (e.g., wherein the auxiliary data is associated with a geographic location within the geographic region, with an address shared with the representation, etc.), temporally (e.g., wherein the auxiliary data and the representation are associated with the same time window, etc.), spatiotemporally, and/or otherwise associated with a representation.

The object representation 30 is preferably determined by an object representation model, but can alternatively be determined by any other suitable model, be determined by a user, be retrieved from a database, or be otherwise determined. The object representation can be: extracted, calculated, aggregated, and/or otherwise determined from the object information.

Figure 5:
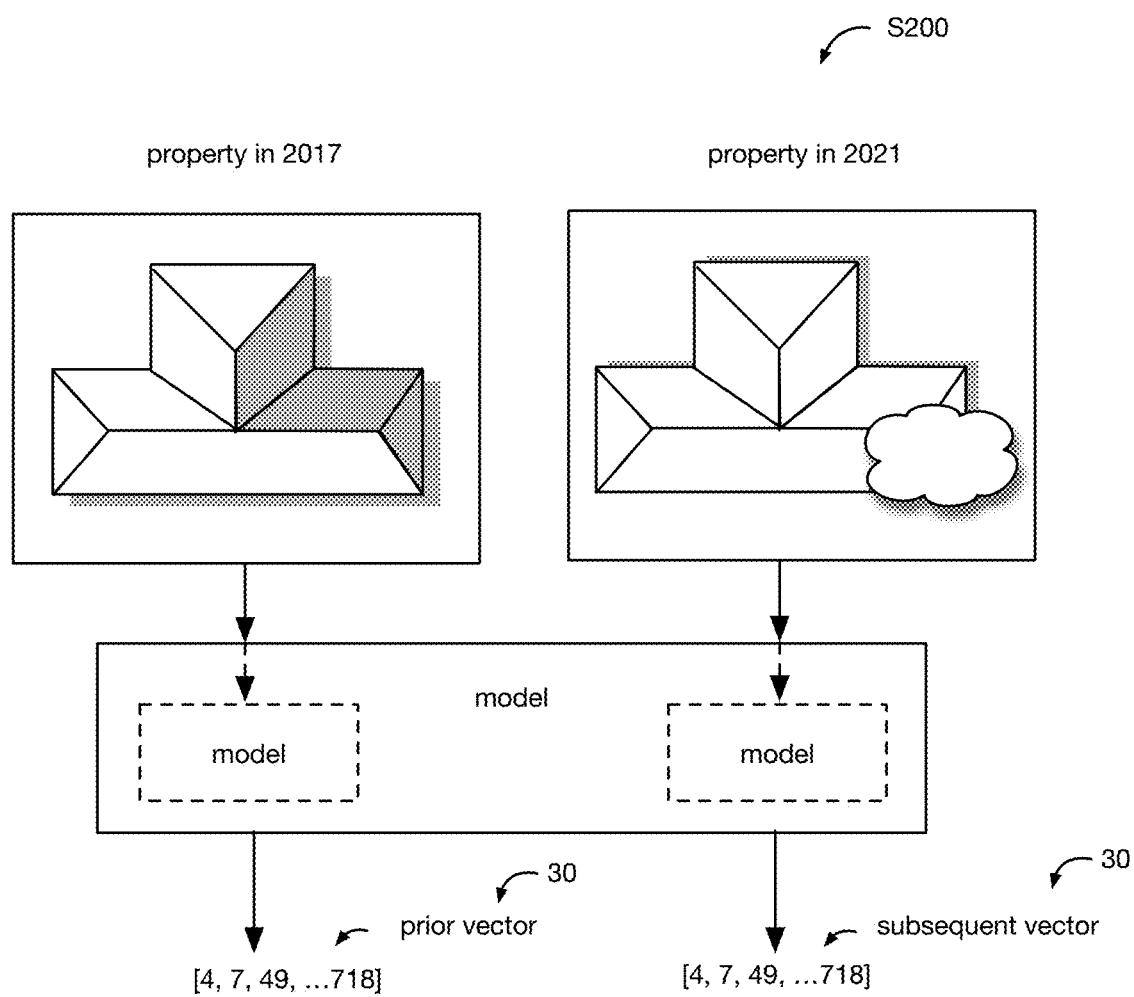
FIG. 5 is an illustrative example of determining a set of representations.
Figure 6A:
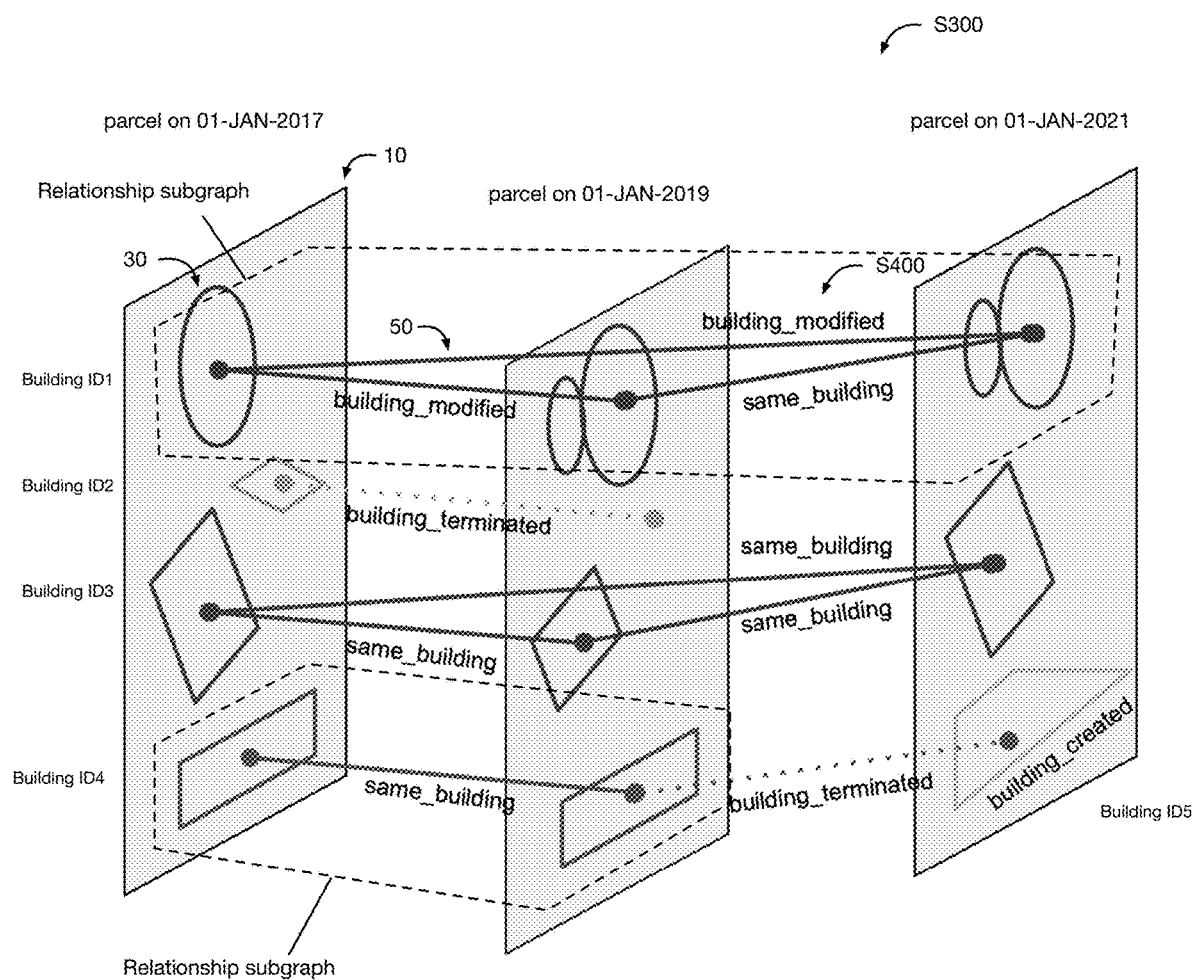
FIG. 6A is an illustrative example of a graph.
Figure 6B:
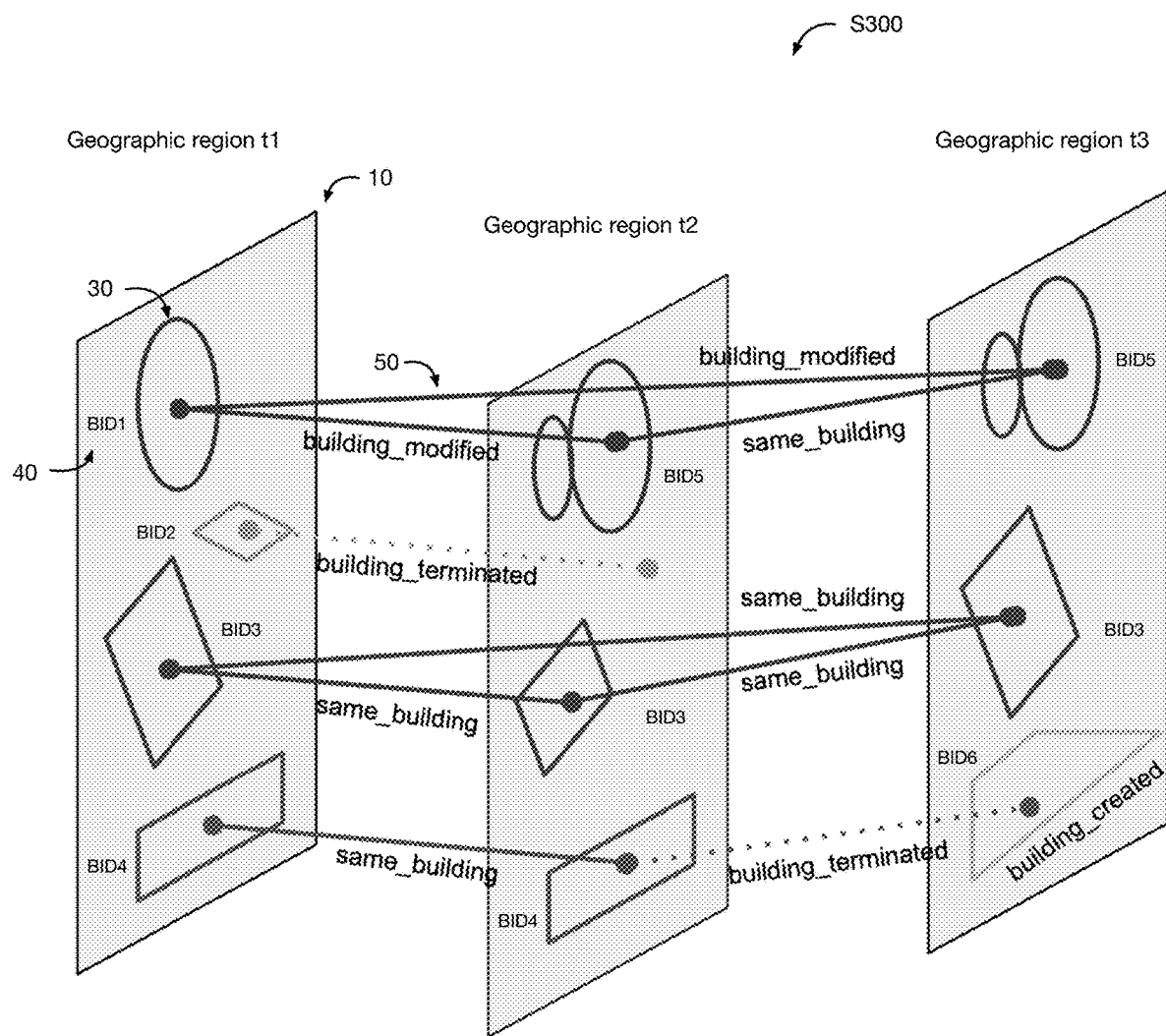
FIG. 6B is a second illustrative example of a graph.

In a first variant, a feature vector (e.g., appearance feature vector, geometric feature vector, etc.) can be extracted from the object information using a neural network model (e.g., example shown in FIG. 5). The object information is preferably a measurement, more preferably an image or a geometric measurement (e.g., DSM), but can alternatively be any other suitable type of object information. In a specific example, the model can be trained to be invariant to common appearance changes (e.g., occlusions, shadows, car presence, registration errors, etc.), wherein the structure appearance of the property can be considered unchanged when the pair of vectors substantially match (e.g., do not differ beyond a threshold difference). In a second embodiment, the model can be trained to not be invariant to common appearance changes.

In a second variant, the object representation is a measurement segment depicting the object. The object segment can be an image segment (e.g., determined from an image), a geometric segment (e.g., determined from a geometric measurement), an object component (e.g., a roof facet, etc.), and/or be otherwise configured. The object segment can be georegistered and/or unregistered. In a first example, an image segment can be determined using an object segmentation model trained to segment the object class of interest. In an illustrative example, a roof segment can be determined within an image (e.g., of a parcel, a wide-area image, etc.) using a roof segmentation model. In a second example, a geometric segment can be determined by masking a geometric measurement using a mask registered to the geometric measurement. The mask can be: an object segment or mask determined from an image (e.g., contemporaneously or concurrently sampled with the geometric measurement), an object segment for an known object version, and/or be any other suitable mask. In a third example, the geometric measurement segment can be determined using an object segmentation model trained to detect segments of an object class of interest within a geometric measurement. In an example, a neural network model (e.g., segmentation model) can be trained to determine object instances within an image, such as by using the methods as discussed in U.S. application Ser. No. 17/336,134 filed 1 Jun. 2021, which is incorporated in its entirety by this reference. However, the measurement segment can be otherwise determined.

In a third variant, the object representation includes a set of dimensions for the object, and can additionally or alternatively include a location and/or orientation for the object. For example, the geometric representation can include a length and width of the object, and can optionally include the height of the object. In this embodiment, the geometric representation can be determined using an object detector (e.g., wherein the dimensions and other parameters, such as location or orientation are determined from the dimensions and parameters of the bounding box), an object segmentation model (e.g., wherein the dimensions and other parameters are determined from the object segment), and/or any other suitable object representation model.

In a fourth variant, the object representation includes a set of components of the object, and can optionally include the parameters for each component and/or characteristics of the set. Examples of components can include: segments, planes, facets, edges (e.g., peaks, valleys, etc.), corners, and/or other object components. For example, the object representation can include a set of roof segments or roof facets for a building, and can optionally include the pose (e.g., location, orientation, surface normal orientation, etc.), dimensions, slope, and/or other parameter of each component, and/or include the count, distribution (e.g., size distribution, slope distribution, etc.) and/or other characteristic of the set. In a first embodiment, the components are determined from a geometric segment (e.g., determined using the first variant), wherein a set of planes (e.g., the components) are fitted to the geometric segment. The model or a second model can optionally distinguish between adjacent components. For example, a model can identify disjoint planes by optionally corresponding planes to depth information and identify disjoint planes with different normal vectors (e.g., determined based on depth information, etc.) as different components (e.g., different roof segments). However, different components can be otherwise distinguished. In a second embodiment, the components are determined using a model trained to determine component instances (e.g., roof segments) and/or extract the component parameters and/or characteristics from the object information (e.g., object measurement). However, the component set, parameters thereof, and/or characteristics thereof can be otherwise determined.

In a fifth variant, the object representations include an attribute set (e.g., attribute vector) for the object. The attributes within the attribute set are preferably the same attributes for all objects (and object versions), but can alternatively include different attributes. The attribute values within the attribute set are preferably determined from the same piece of object information, but can additionally or alternatively be determined from contemporaneous object information (e.g., object information captured, generated, or otherwise associated with a common time frame, such as within 1 day, 1 week, 1 month, or 1 year of each other), from object information known to be associated with the same object version, and/or from any other suitable set of object information. For example, the attribute vector can include values for each of a set of attributes that were extracted from the same measurement (e.g., image) or from measurements sampled the same day (e.g., by the same vendor, by different vendors, etc.). The attribute values can be determined by one or more attribute models, and/or otherwise determined.

In a sixth variant, the object representations can include a combination of the above variants.

However, the set of representations can be otherwise determined.

4.3 Determining Relationships Between Representations S300.

Determining relationships between object representations S300 functions to determine whether the object representations within the set are associated with different physical object versions and/or how the physical object versions are related with each other.

Different object versions 40 are preferably different versions of the same object (e.g., an original building and a remodeled building are different versions of the same building), but can additionally or alternatively be different objects altogether (e.g., an original building and a new building post demolition).

Different object versions 40 preferably have different physical geometries (e.g., different footprints, different boundaries, different heights, different topography, etc.), but can additionally or alternatively have different appearances (e.g., different paint, different roofing or siding material, etc.), and/or be otherwise differentiated.

Different object versions 40 can be associated with different object identifiers. Each object identifier preferably identifies a single object version (e.g., example shown in FIG. 6B), but can alternatively identify multiple object versions (e.g., identify all related buildings located on the same or overlapping geographic region; example shown in FIG. 6A). The identifiers are preferably globally unique (e.g., are universally unique identifiers (UUID) or globally unique identifiers (GUID)), but can additionally and/or alternatively be locally unique (e.g., to the geographic region), not be unique, and/or otherwise related. The object identifier can be: a hash of the object's characteristics (e.g., geometric characteristics, visual characteristics, etc.), generated from the object representations associated with the object version, a randomly generated identifier, an index, a nonce, be generated based on a geographic region identifier, be generated based on the object version parameters (e.g., timeframe, etc.), be generated based on a prior object version's identifier, a unique combination of semantic words or alphanumeric characters, or be any other suitable identifier. The geographic region identifier can be an address, a hash of an address, an index, randomly generated, and/or otherwise determined. Examples of object identifiers (e.g., building identifier, structure identifier, etc.) include: an address and timestamp combination (e.g., wherein the timestamp is associated with the object version), a hash of the object representation associated with the object version, an object representation associated with the object version, and/or any other identifier.

The relationships 50 (e.g., examples shown in FIG. 7, FIG. 12, FIG. 13, etc.) are preferably determined by comparing the object representations 30, but can alternatively be manually determined, predicted (e.g., using a model, from the object representations 30 or the underlying object information 20), and/or be otherwise determined.

The compared object representations are preferably associated with the same geographic region (e.g., same parcel, the same geofence, the same geolocation, the same address, etc.), but can additionally and/or alternatively be associated with different geographic regions (e.g., disjoint geographic regions), related geographic regions (e.g., wherein one geographic region overlaps with the other), be randomly selected (e.g., from a set of representations extracted for a plurality of object instances), and/or be otherwise determined. The compared object representations are preferably temporally adjacent or sequential, but can alternatively be temporally disparate (e.g., separated by one or more intervening object representations). In a first example, all representations associated with the same geographic region are compared with each other. In a second example, temporally adjacent representations are compared with each other. However, any other set of representations can be compared.

S300 can include determining whether the object representations 30 represent the same object version 40.

Object representations indicative of the same physical object geometries (and/or appearances) are preferably associated with the same object version, while object representations indicative of different physical object geometries (and/or appearances) are preferably associated with different object versions. Alternatively, object representations indicative of different physical object geometries and/or appearances can be associated with the same object version, while object representations indicative of the same physical object geometries and/or appearances can be associated with different object versions.

Object representations that represent the same object version can substantially match (e.g., are an exact match or match within a predetermined margin of error, such as 0.1%, 1%, 5%, etc.), have a similarity greater than a similarity threshold (e.g., Jaccard Index, Sorensen-Dice coefficient, Tanimoto coefficient, etc.), or have a distance less than a threshold distance (e.g., the cosine distance, Euclidean distance, Mahalanobis distance, or other similarity distance is less than a threshold distance); alternatively, the object representations representative of the same object version can be otherwise determined. Object representations representative of the same object version are preferably sequential, serial, or temporally adjacent (e.g., there is no intervening object representation or object version), but can alternatively not be sequential. For example, an object version can be determined for each set of temporally adjacent object representations that are substantially similar. Object representations representative of different object versions are preferably substantially differentiated (e.g., the differences exceed a margin of error) and/or have less than a threshold similarity (e.g., the cosine distance, Euclidean distance, Mahalanobis distance, or other similarity distance is higher than a threshold distance); alternatively, the object representations representative of different object versions can be otherwise determined.

In a first variant, determining whether the object representations represent the same object version can include comparing the object segments. In a first embodiment, comparing the object segments includes determining the object segment overlap (e.g., geographic overlap), wherein the object representations represent the same object version when the overlap exceeds a threshold and/or the non-overlapping portions falls below a threshold. In a second embodiment, comparing the object segments includes comparing the segment projections (e.g., footprints) and/or geometries, wherein the object representations represent the same object version when the projections and/or geometries are similar above a threshold. This embodiment can mitigate against registration errors between the underlying object measurements. However, the segments can be otherwise compared.

In a second variant, determining whether the object representations represent the same object version can include comparing feature vectors (e.g., extracted using the appearance change-agnostic model) and/or attribute vectors. In this variant, the object representations can be considered to represent the same object version when the vectors match (e.g., exactly or above a threshold similarity). However, the feature vectors can be otherwise compared.

In a third variant, determining whether the object representations represent the same object version can include comparing component sets and/or parameters or characteristics thereof. In a first embodiment, the object representations represent the same object version when the components within the sets match, or when one set is a subset of the other. In a second embodiment, the object representations represent the same object version when the component sets have substantially the same component parameter or characteristic distributions. For example, the object representations represent the same object version when the number of roof facets are substantially the same, when the slope distribution is substantially the same, when the roof peak or valley locations are substantially the same, and/or other component parameters or characteristics are substantially the same.

However, whether the object representations represent the same or different object versions can be otherwise determined.

S300 can additionally or alternatively include determining whether the object versions or object representations are related, and/or how the object versions or object representations are related. Object versions can be considered related when they are the same object version, are derivatory object versions (e.g., one object version is a modified version of the other object version), or otherwise related. Object representations can be considered related when they represent the same object version, represent derivatory object versions (e.g., one object version is a modified version of the other object version), or otherwise related.

Relationships 50 can be characterized by: a relationship class (e.g., relationship type), a similarity metric (e.g., cosine distance, affinity, etc.), an amount of change, the changed segments (e.g., wing added/removed, highlight the portions of a building that have been modified, etc.), and/or otherwise characterized. Examples of relationship classes can include: same, unchanged, modified, added, removed, replaced, or other relationship types. Relationships 50 can be between object representations 30, object versions 40, and/or any other suitable entity.

In a first illustrative example, two object versions are considered the "same" when the geometries (e.g., represented by object segments, object component sets, object feature sets, attribute vectors, etc.) substantially match; "modified" when a prior object version shares geometric segments with the latter object version (e.g., the geometric segments intersect; the component sets intersect or include shared components); "replaced" when a prior object version does not share geometric segments with the latter object version (e.g., the geometric segments are disjoint; the component sets do not share components); "added" when there was no prior object version (e.g., in the geographic region) and there is a latter object version; and "removed" when there was a prior object version (e.g., in the geographic region) and there is no latter object version.

In a second illustrative example, two object representations are considered to be the "same" when the respective object versions have the same geometries; "modified" when the object version represented by the prior object representation ("prior object version") shares geometric segments with the object version represented by the latter object representation ("latter object version"); "replaced" when the prior object version does not share geometric segments with the latter object version (e.g., the geometric segments are disjoint; the component sets do not share components); "added" when the prior object representation represents no object (e.g., is indicative of an empty space) and the latter object representation represents an object; and "removed" when the prior object representation represents an object and the latter object representation represents no object (e.g., is indicative of an empty space).

However, the relationships can be otherwise defined.

A single relationship is preferably determined between each pair of object versions and/or object representations; alternatively, multiple relationships can be determined between each pair of object versions and/or object representations.

Collectively, the method (e.g., one or more instances of S300) can determine a set of relationships tracking a history of object changes over time (e.g., a building change history). The set of relationships can be determined for: a geographic region (e.g., a parcel), an object, or for any other entity. In a first variant, the set of relationships can be specific to an object (e.g., a building, a tree, a pool), wherein the representations connected by the set of relationships are associated with the same object, and describe the relationship between the object versions (e.g., object states; how the object has changed over time). In a second variant, the set of relationships can be specific to a geographic region (e.g., a parcel), wherein the representations connected by the set of relationships cooperatively describe how different objects within the geographic region are related (e.g., the relationship between buildings on the property over time). However, the set of relationships can be otherwise specified.

This set of relationships 50 between the object versions 40 and/or object representations 30 can cooperatively form a graph (examples shown in FIG. 6A and FIG. 6B), but can be represented as a matrix, a table, a set of clusters, and/or otherwise represented. The graph can be a partially connected graph, a fully connected graph, and/or any other suitable type of graph.

In a first variant, nodes of the graph can represent object versions, and edges of the graph (e.g., connecting pairs of nodes) represent relationships between the object versions. The nodes (e.g., object versions) can additionally or alternatively be associated with object representations, auxiliary data (e.g., measurement identifiers, timestamps, etc.), object information, and/or any other suitable data.

In a second variant, the nodes of the graph can be object representations. In this variant, the object representations associated with the nodes can include object representations extracted from all available data for a given property or object, only the latest representation (e.g., to detect changes; be a 2-node graph), and/or represent any other set of data or timeframes. In this variant, object representations connected by a "same" relationship can be assigned the same object version identifier, while object representations connected by other relationships can be assigned different object version identifiers.

The nodes are preferably ordered by time, but can alternatively be ordered by the relationship type, by statistical distance, or otherwise ordered. Connected nodes are preferably associated with the same geographic region, but can alternatively be associated with the same object and/or be otherwise associated.

The edges are preferably associated with a relationship type (example shown in FIG. 6A and FIG. 6B), but can additionally and/or alternatively not be associated with a relationship type. In a first variant, the edges can be defined between representations of the same building (e.g., a relationship between the representations is classified as "unchanged" or "modified"); example shown in FIG. 6A and FIG. 6B. In a second variant, the edges can be defined between representations of different buildings (e.g., different buildings are associated with the same property). However, the edges can be otherwise defined.

However, the set of relationships between object versions and/or object representations can be otherwise represented.

The relationship 50 between two object versions 40 is preferably determined based on the respective object representations 30 (e.g., the object representations used to distinguish between the object versions, different object representations, etc.) (e.g., example shown in FIG. 12), but can additionally or alternatively be determined based on the object information associated with the object versions (e.g., object information generated during each object version's timeframe, object information used to determine the object representations, etc.), auxiliary data associated with each object version, and/or any other suitable information.

Figure 4:
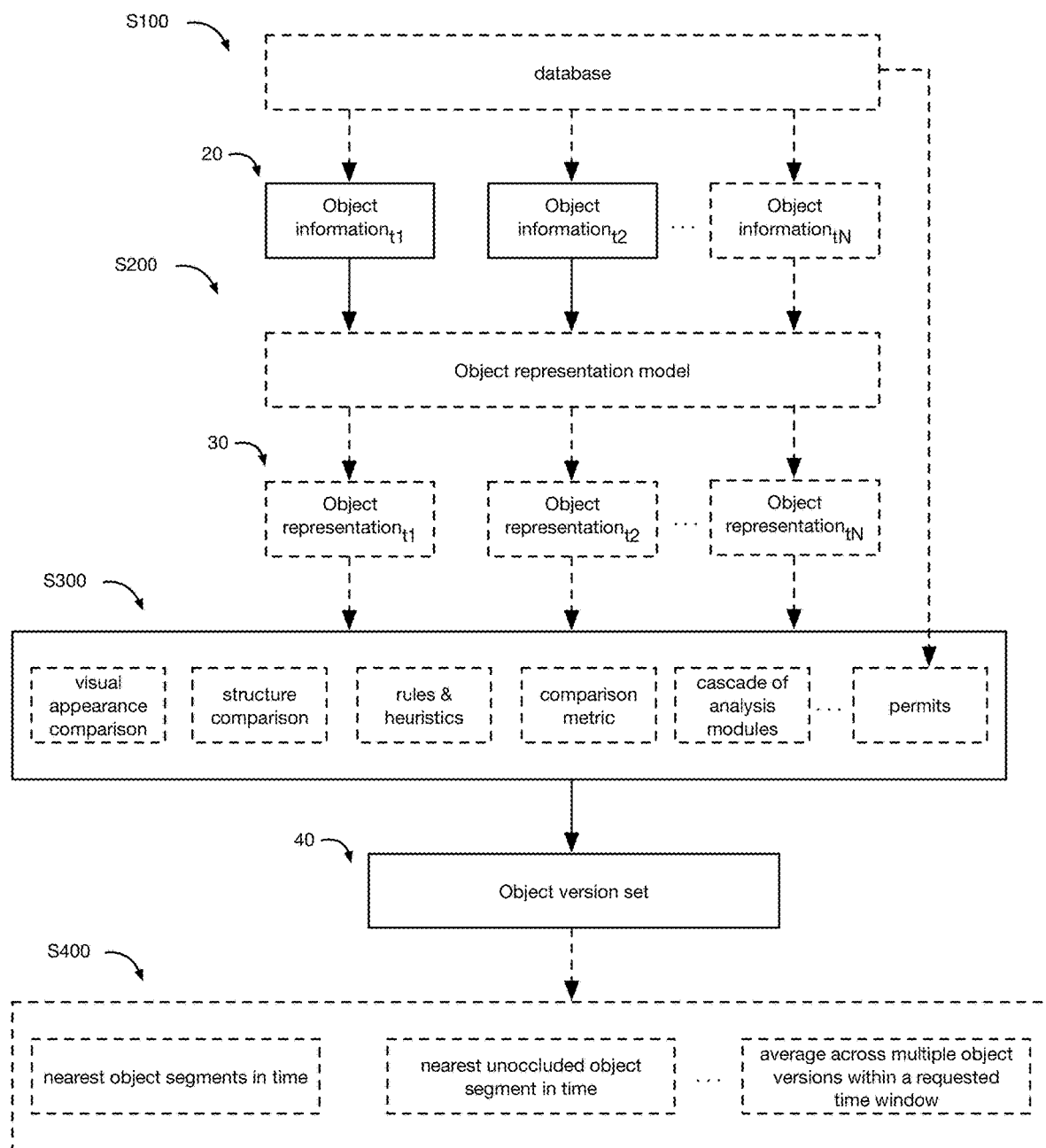
FIG. 4 is an illustrative example of a variant of the method.

Object version relationships can be determined using a trained model, be determined using a ruleset, be calculated, be manually assigned, and/or be otherwise determined (e.g., examples shown in FIG. 4).

Figure 7:
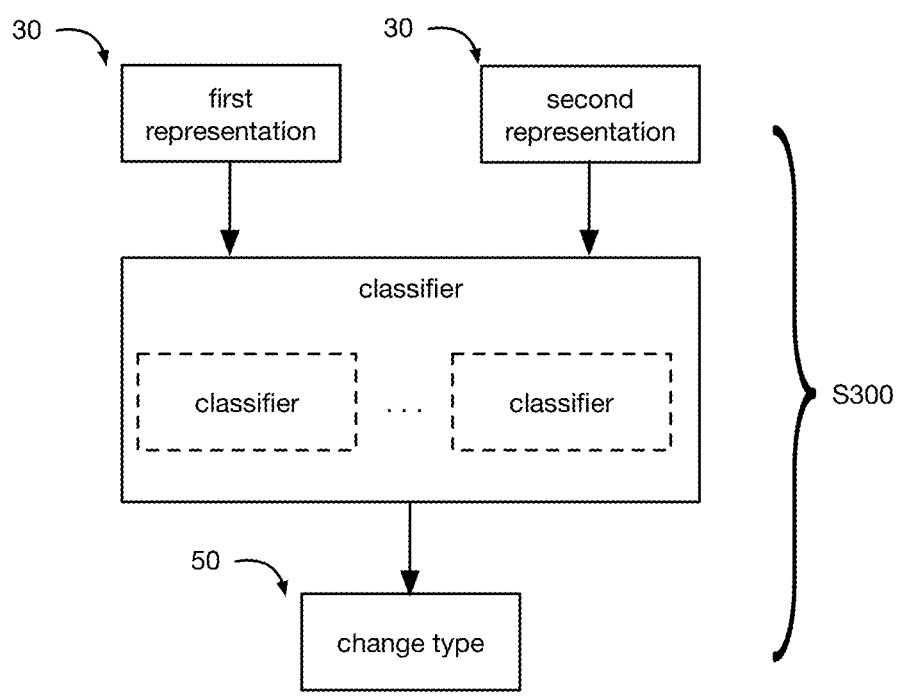
FIG. 7 is a schematic representation of determining relationships between representations.

In a first variant, S300 includes classifying the relationship between object representations (and/or respective object versions); example shown in FIG. 7. The classifier can ingest a set of object representations (e.g., a representation pair) and output a relationship classification (e.g., "unchanged", "modified", "replaced", "added", "removed", etc.). The representations can be feature vectors (e.g., determined using the appearance change-agnostic model), measurement segments, attribute vectors, and/or other representations. The representations are preferably the same representation type (e.g., both are segments, both are feature vectors, both are attribute vectors, etc.), but can alternatively be different representation types. The classifier can be trained using ground-truth data including object representation sets (e.g., vector pairs, extracted from different measurements) labeled with the respective relationship class (e.g., change type labels), and/or using any other training data. The ground-truth relationship class can be determined manually, labeled using contemporaneous permit or tax data (e.g., labeled as "modified" when a permit exists for the timeframe, labeled as "removed" when the tax records show no improvements/land only, labeled as "replaced" when the taxable value changes but no sale has occurred, etc.), but can alternatively be labeled using any other suitable method. For example, a set of appearance vectors extracted from different measurements by the same model can be fed to the classifier, wherein the classifier predicts a relationship label for the appearance vector set.

Figure 8:
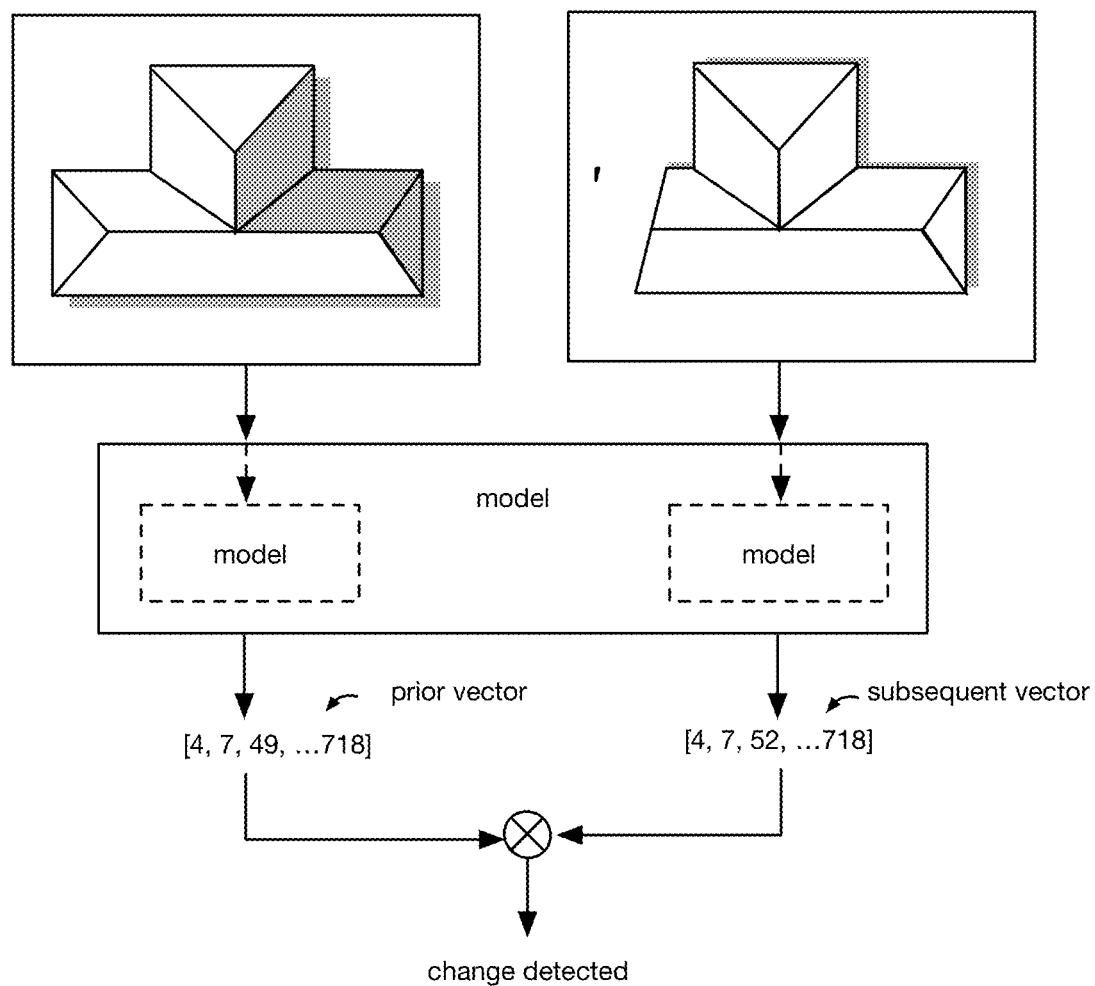
FIG. 8 is an illustrative example of change detection.

In a second variant, S300 includes determining the relationship between the object representations (and/or respective object versions) based on a comparison metric between the representations. In this variant, the representations can be a vector of attribute values (e.g., such as roof pitch, roof slope, etc.; example shown in FIG. 8), be a feature vector, and/or be any other representation. The attribute within the vector can be selected to be indicative of object instance similarity (e.g., using SHAP values, lift, etc.), be unselected (e.g., include all attributes), or be otherwise selected. The comparison metric can be a distance metric (e.g., Euclidean distance, Chebyshev distance, etc.), a similarity metric (e.g., Jaccard similarity, cosine similarity, etc.), a dissimilarity metric, and/or any other suitable comparison metric. In a first embodiment, the distance metric values can be binned or thresholded, wherein each bin or threshold is associated with a different relationship class (e.g., small distances are binned to "unmodified" or "modified", wherein large distances are binned to "added", "removed", or "heavily modified", etc.). However, the distances can be otherwise interpreted.

Figure 9:
FIG. 9 is an illustrative example of classifying the change between image pairs.
Figure 10A:
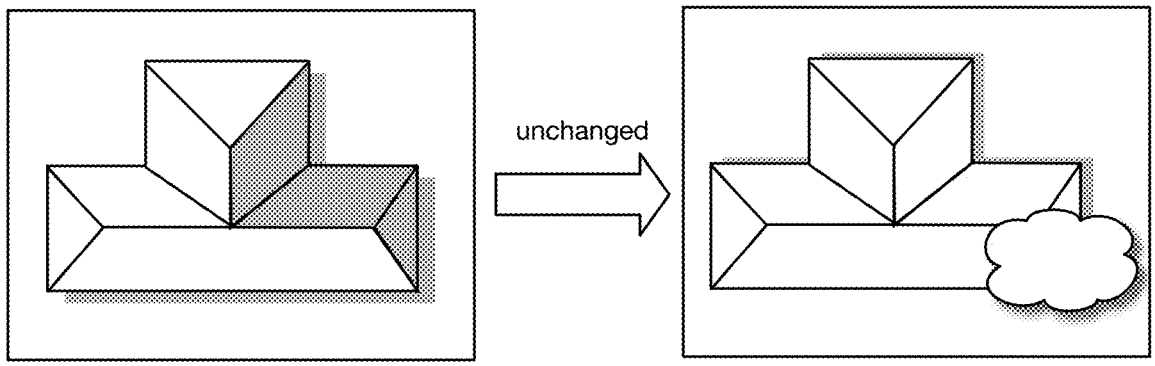
FIGS. 10A-10E are illustrative examples of determining relationships between representations.
Figure 10B:
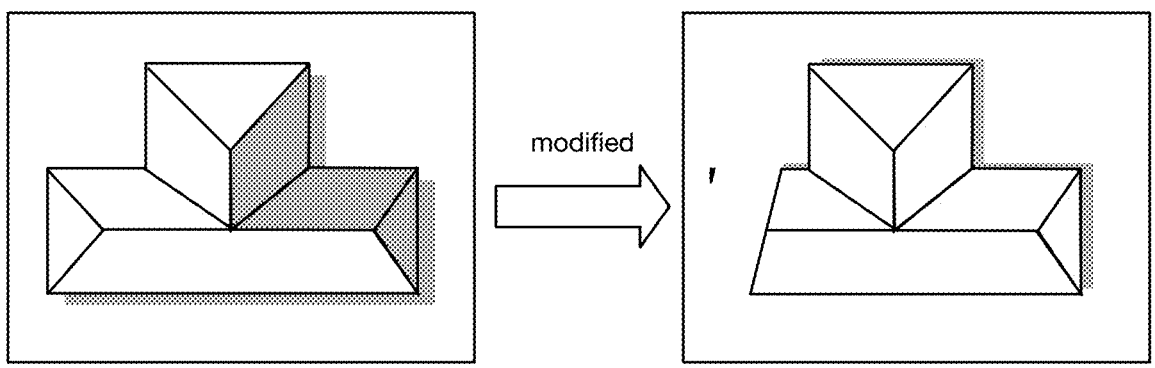
Figure 10C:
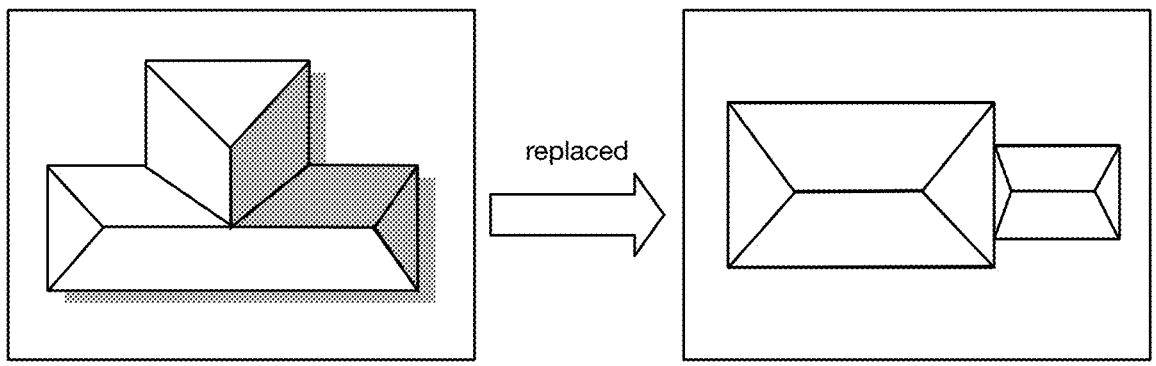
Figure 10D:
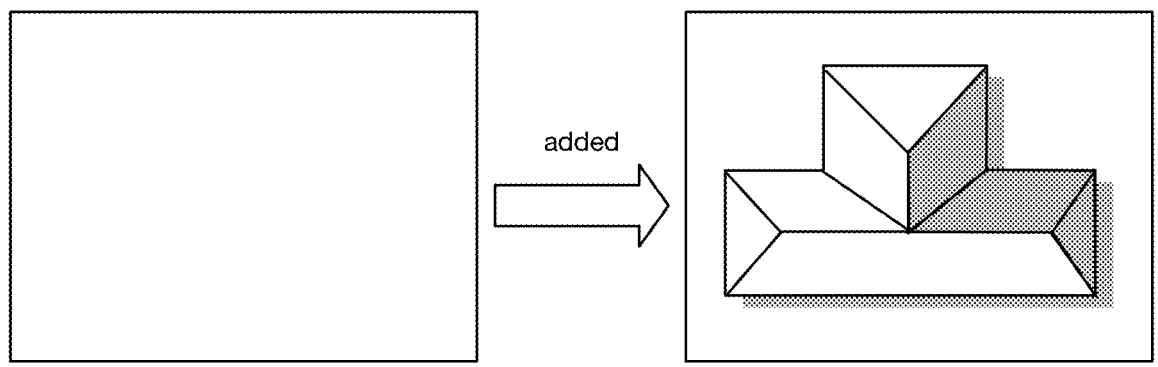
Figure 10E:
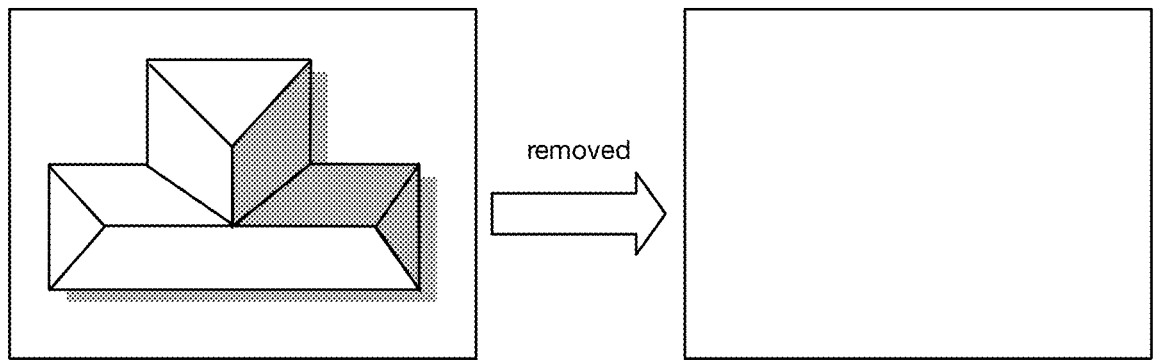

In a third variant, relationships between the representations (and/or respective object versions) can be determined based on rules and heuristics; example shown in FIG. 9. In this variant, the representations are preferably geometric representations, but can be other representations.

In a first example, each representation can include a set of roof facets. The relationship between a pair of representations (and/or respective object versions) can be considered: unchanged when the roof facets match; modified when the geometric representations share at least one roof facet; added when the prior geometric representation had no roof facets and the subsequent geometric representation has some roof facets; removed when the prior geometric representation had some roof facets and the subsequent geometric representation has no roof facets; and replaced when the pair of geometric representations both have roof facets but none match; example shown in FIGS. 10A-10E. In this example, a structure can be considered the same structure when the subsequent and prior structures share a common roof facet or segment (e.g., when the structure is unchanged or is modified). Otherwise, the structure can be considered a different structure (e.g., a different object variant). In a second example, each representation can include a set of measurement segments (e.g., image segments or geometric segments). The relationship between a pair of representations (and/or respective object versions) can be considered: unchanged when the segments match; modified when the segments overlap; added when there was no prior measurement segment and there is a subsequent measurement segment; and removed when there was a prior measurement segment and there is not a subsequent measurement segment.

In a second example, permits (e.g., remodeling permits) relevant to the object (e.g., property) from the same timeframe as the pair of representations can indicate that an object was modified.

In a third example, tax information relevant to the property from the same timeframe as the representations can signal that an object was modified. This auxiliary data (e.g., permit data, tax data, etc.) can be used to validate, disambiguate, specify, or otherwise influence a relationship between representations. However, rules, criteria, and/or heuristics can otherwise determine relationships between the representations.

In a fourth variant, relationships between the representations can be determined based on a cascade of analysis modules. In a first example, a first analysis module can use geometric analysis to determine coarse changes (e.g., added, removed, same footprint, different footprint, etc.) and a second analysis module can use appearance-based methods and/or classifiers to distinguish between finer changes after the coarse changes have been determined (e.g., detect occurrence of a remodel if same footprint, determine magnitude of change if different footprint, etc.). In a second example, a first analysis module can use appearance-based methods to determine whether the structure has changed, a second analysis module can use geometric representation (e.g., extracted from the same measurement or a contemporaneous measurement) to determine whether the structure remains the same, and a third analysis module can use appearance representation to determine (e.g., classify) the type of structure change. In a third example, the second variant can be used to determine the object representations that represent the same object versions (e.g., wherein vectors that are substantially similar represent the same object versions), then the first variant or the third variant can be used to classify the relationships between the object versions. However, the cascade of analysis modules can otherwise determine relationships between the representations.

However, the relationships can be otherwise determined.

S300 can additionally include identifying object versions 40 based on the relationships. In a first variant, an object version can be associated with or identified as a set of related object relationships (e.g., set of connected nodes); example shown in FIG. 6A. In a second variant, an object version can be associated with or identified as representations related by a predetermined subset of relationship types (e.g., only unchanged or "same", example shown in FIG. 6B; only unchanged and modified, etc.). In a first example, object representations representing the same object version are identified, then relationships between the object versions are determined (e.g., example shown in FIG. 12). In a second example, relationships between the object representations can be determined, wherein object versions can be determined based on the relationships (e.g., using a set of rules), and the relationships between different object versions can be determined from (e.g., inherited from) the relationships between the respective object representations (e.g., example shown in FIG. 13). In a third variant, an object version can be associated with or identified as a set of substantially similar object representations. However, the object version can be otherwise determined.

Each object version 40 can be assigned one or more object identifiers, as discussed above.

Each determined object version 40 can be associated with: a timeframe, the geographic region (e.g., from the object representations and/or object information), the related object representations, the object information used to determine the related object representations, auxiliary data spatially and/or temporally related to the object version, and/or other information.

The timeframe for an object version can encompass all of the related object representations' timestamps (e.g., examples shown in FIG. 12 and FIG. 13) and/or exclude one or more related object representations' timestamps. The beginning of the timeframe for an object version can be: the timestamp of the first related object representation, the timestamp of the last object representation associated with a prior object version, a manually-specified time, a time determined from change-related object information (e.g., permit information, construction information, etc.), and/or otherwise determined. The end of the timeframe for an object version can be: the timestamp of the last object representation related to the object version, the timestamp of the first object representation associated with a subsequent object version, a manually-specified time, a time determined from completion-related object information (e.g., final certification, insurance documentation, etc.), and/or otherwise determined. However, the object version timeframe can be otherwise defined.

The auxiliary data associated with an object version can be associated with the object version: spatially (e.g., both are associated with the same geographic region), temporally (e.g., the auxiliary data has a timestamp falling within the object version timeframe), spatiotemporally, by object information (e.g., both the object representation associated with the object version and the auxiliary data were determined from the same object information), associated based on parameters (e.g., spatial parameter, temporal parameter, etc.) shared with the object version and/or the measurements associated with the object version, and/or be otherwise associated with the object version. Auxiliary data can include: object information from other vendors, object representations determined using object information from other vendors, object descriptions (e.g., property descriptions), permit data, insurance data (e.g., loss data, assessment data, etc.), inspection data, appraisal data, broker price opinion data, property valuations, attribute and/or component data (e.g., values), and/or other data.

However, the object versions can be associated with any other suitable information.

4.4 Generating an Analysis Based on the Relationships S400.

Generating an analysis based on the relationships S400 functions to describe an object version, the timeseries of object versions, and/or other relationships between object versions.

The analysis is preferably generated in response to a query (e.g., the query including an object identifier, geographic coordinates, an address, a time, etc.), but can additionally and/or alternatively be generated in response to a request from an endpoint, be generated before the request is received (e.g., when a specific relationship is detected, when new property data is received, etc.), be generated for each change (e.g., calculated when a changed relationship is determined), and/or any other suitable time. The analysis can be generated by traversing through a graph or a relationship set, by retrieving data associated with an object version, and/or be otherwise generated.

Figure 14:
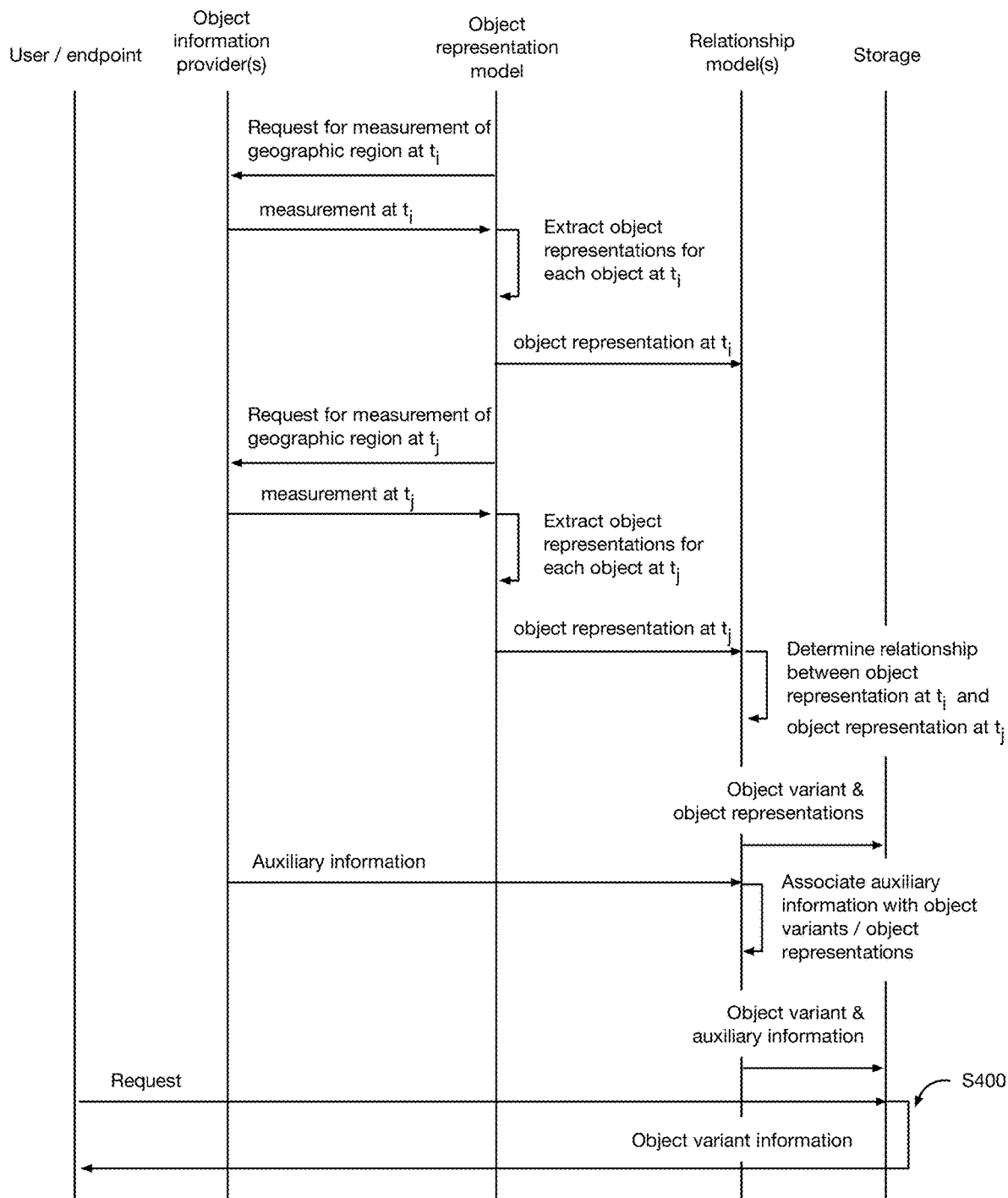
FIG. 14 is an illustrative example of an example of the method, including returning object version information responsive to a request.

In an example, S400 can include: receiving a request identifying an object version; identifying the relationship set (e.g., graph or subgraph) associated with the object version; and returning information extracted from measurements associated with (e.g., used to generate) the object representations within the relationship set (e.g., example shown in FIG. 14). In a first illustrative example, S400 can include: receiving a request with an address and a timestamp (e.g., the time at which the property was insured); identifying the relationship set associated with the address (e.g., the geographic region's relationship set); identifying the object version associated with the timestamp (e.g., the object version with the timeframe encompassing the timestamp); and generating a response based on the measurements associated with the object version (e.g., used to generate the object representations associated with the object version).

In a second example, S400 can include: receiving the request identifying the object version and a set of requested data types, and retrieving object data associated with the object version that satisfies the request. However, the analysis can be otherwise initiated and/or used.

Examples of analyses that can be determined include: the relationship between a first and second object version (e.g., the next object version, a prior object version, the current object version etc.); a timeseries of changes between a first and second object version (e.g., change type, change time, building development history, parcel development history, etc.); whether the requested object version is the most recent object version for the geographic region; the most recent object version for a requested geographic region; the timeframe or duration for a requested object version; data associated with a requested object version (e.g., measurements, object representations, feature vectors, attribute values, etc.); an analysis of the timeseries that the requested object version is a part of (e.g., number of changes, types of changes, average object version duration, etc.); an analysis of the object versions associated with a requested timeframe; an analysis of the auxiliary data associated with the object version (e.g., statistical analysis, lookup, prediction, etc.); anomaly detection (e.g., a temporary structure); and/or other analyses (e.g., examples shown in FIG. 4).

In a first example, S400 can include identifying measurements for an object version and generating the analysis from the set of identified measurements. The identified measurements are preferably associated with the object version's timeframe (e.g., sampled during object version's timeframe; etc.) and/or be otherwise associated with the object version. In a first embodiment, the analysis can include selecting the best measurement (e.g., image) of the object version based on a set of criteria (e.g., measurement with minimal shadows, measurement with maximal resolution, most up-to-date measurement, and least occluded, etc.). In a second embodiment, the analysis can include generating a synthetic measurement from said measurements (e.g., averaged measurement across a sliding window of measurements, etc.). In a third embodiment, attribute values (e.g., roof slope, etc.) can be extracted from the identified measurements (and/or best measurement) and be used as the attribute values for the object version. In a fourth embodiment, object polygons for the object version can be extracted from the identified measurements.

In a second example, S400 can include limiting returned data to data for the specified object variant and/or modifications thereof. For example, if the structure of the specified object (e.g., identified by a timestamp, an object identifier, etc.) was wholly replaced by a replacement structure, information for the original structure can be returned, and information for the replacement structure would not be returned.

In a third example, S400 can include generating a timeseries of changes for a parcel. This can include compiling the time series of relationships between serial representations, serial object versions, or be otherwise performed.

In a fourth example, S400 can include determining whether an object version has changed since a reference time or reference object variant. In this variant, the relationship set can be analyzed to determine whether any change-associated relationships appear after the reference time or reference object variant.

In a fifth example, S400 can include generating an analysis based on relationships between object variants within geospatial extent (e.g., a set of geographic coordinates of a neighborhood) and/or a set of object identifiers (e.g., a set of addresses). In a first example, the analysis can include neighborhood-level statistics on object development (e.g., percentage of objects undergoing development within a neighborhood, average percentage of objects undergoing development across a set of neighborhoods). In a second example, the analysis can include statistics for a list of addresses (e.g., average frequency of change occurrence between the addresses within a time interval).

In a sixth example, S400 includes determining whether an object has changed based on the latest representation and a new representation determined from new property data. When the object has changed (e.g., the relationship between the latest and new representations is indicative of change), the new representation can be stored as the latest representation for the object (and/or a new object version can be created), and the prior representation can optionally be discarded; alternatively, the representations can be otherwise handled. Object information extracted from the new property data can optionally be stored in association with the new object version, and the old object information can optionally be discarded or associated with the prior object version. When the object has not changed (e.g., the relationship between the latest and new representations is not indicative of change), the object information extracted from the new property data can be: discarded, merged with the prior object information, and/or otherwise used.

However, any other analysis can be performed.

S400 can additionally include providing the analysis to an endpoint (e.g., an endpoint on a network, customer endpoint, user endpoint, automated valuation model system, etc.) through an interface, report, or other medium. The interface can be a mobile application, web application, desktop application, an API, and/or any other suitable interface executing on a user device, gateway, and/or any other computing system.

However, S400 can be otherwise performed.

5. Use Cases

Figure 11:
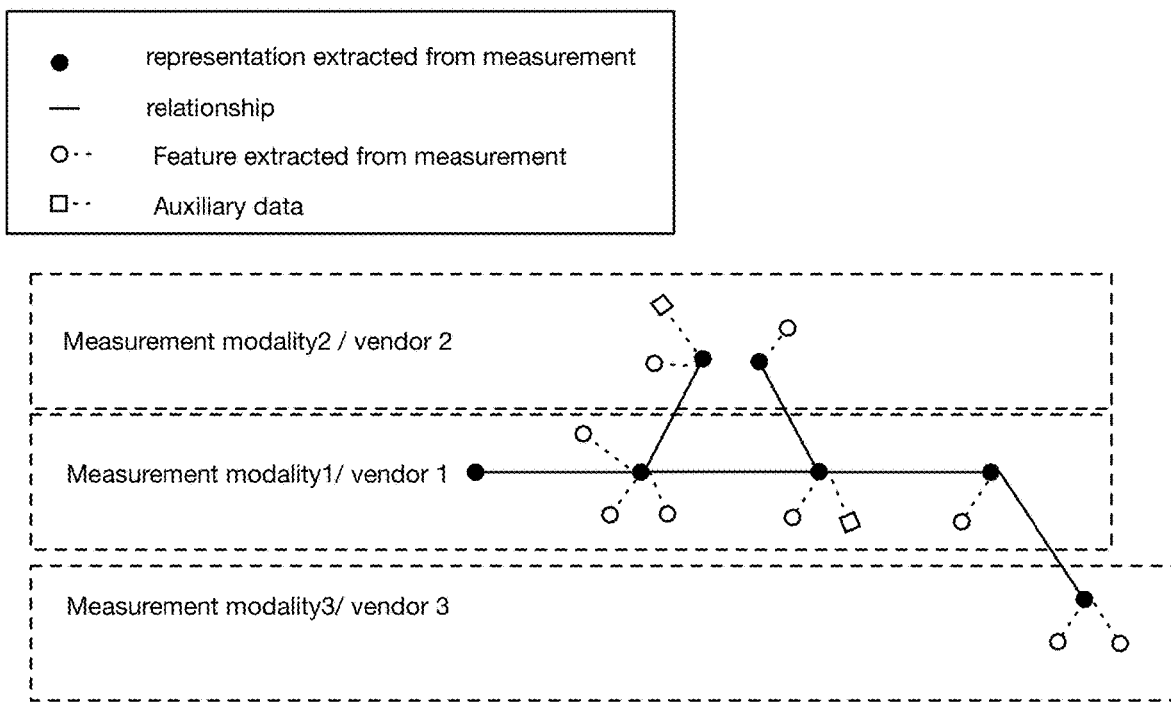
FIG. 11 is an illustrative example of relationships determined between different modality measurements for a given object.
Figure 12:
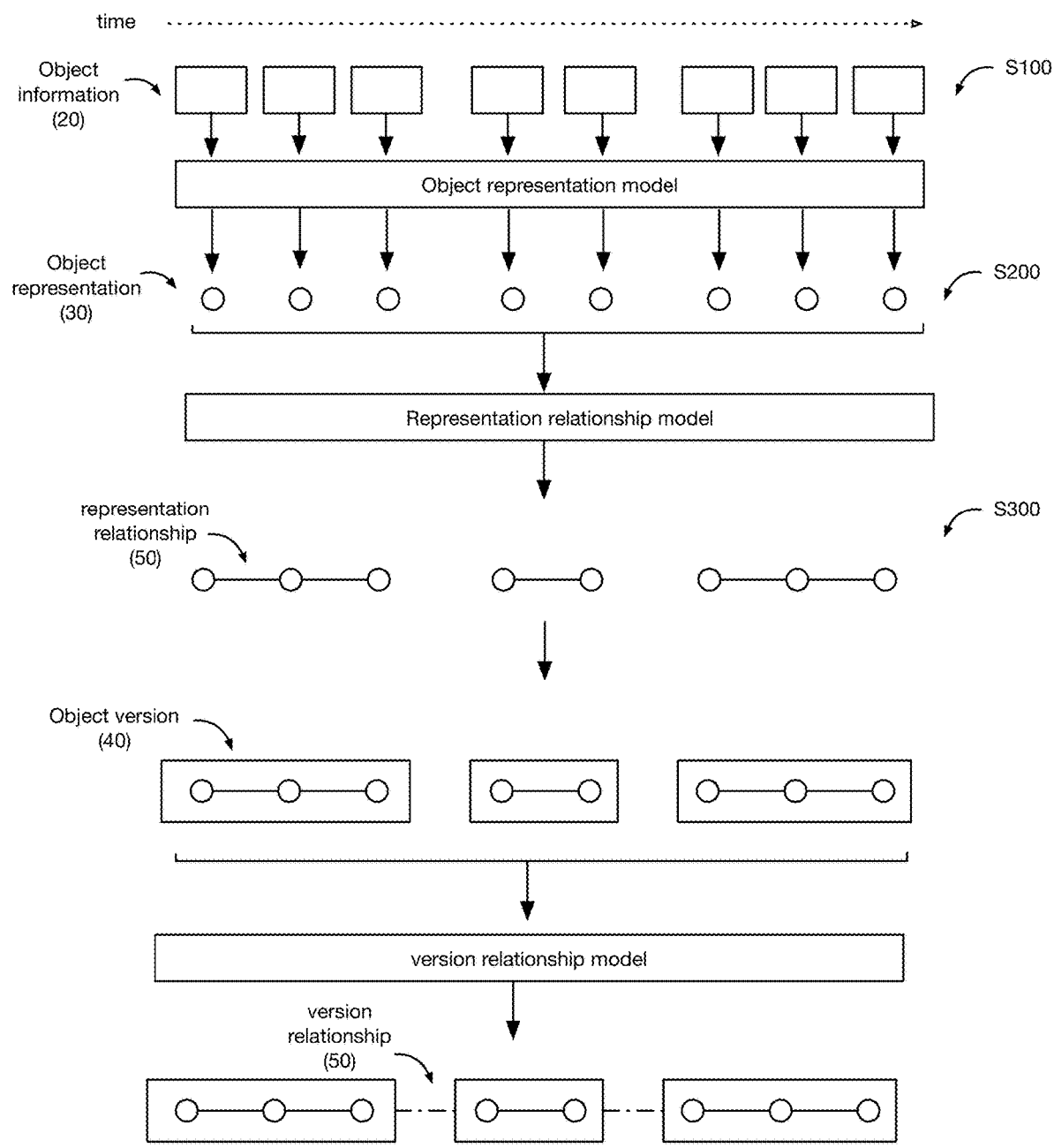
FIG. 12 and FIG. 13 are schematic representations of a first and second variant of the method, respectively.
Figure 13:
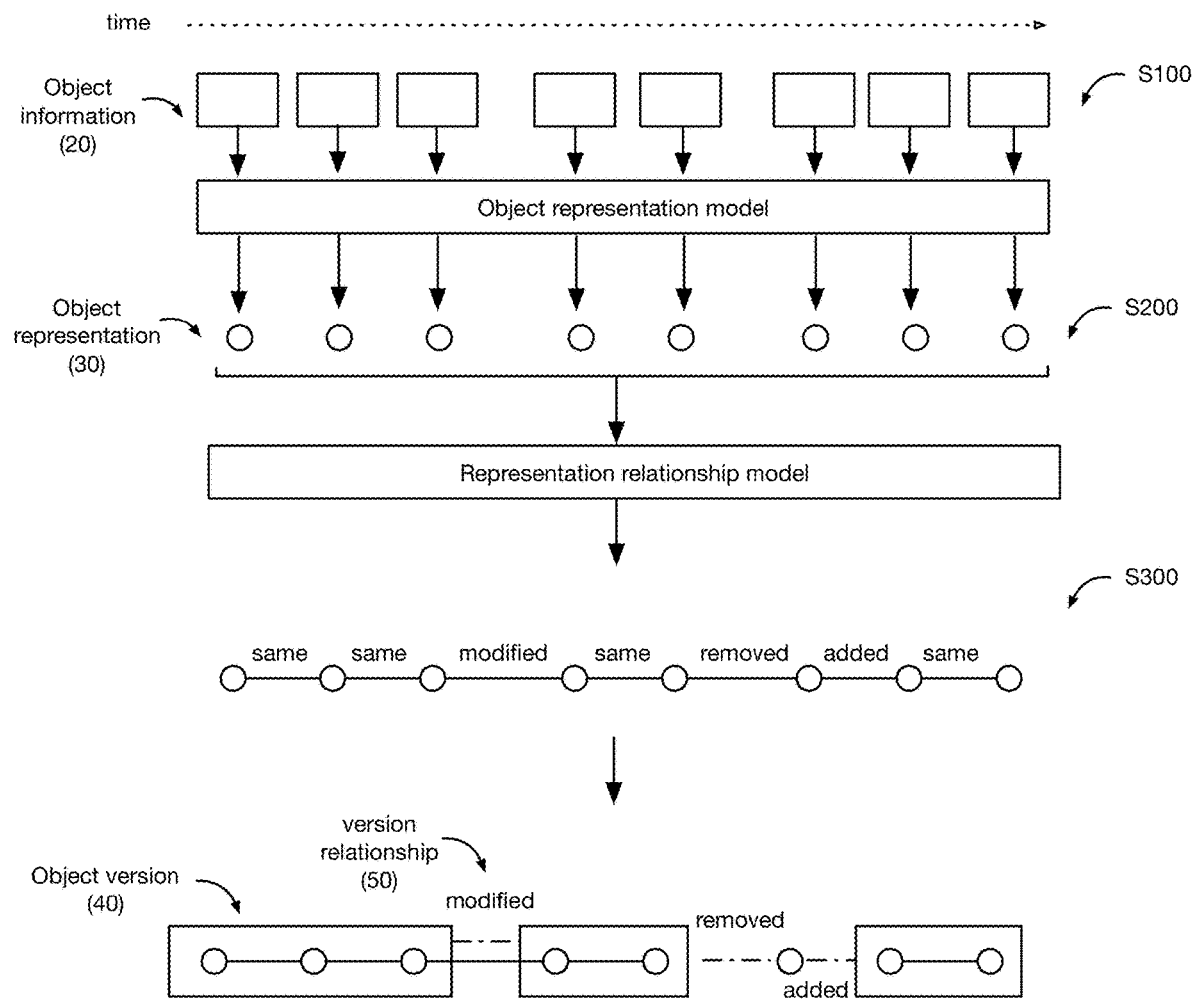

The relationship set can be used to track changes of an object over time (e.g., structure modified, structure replaced, structure added, structure removed, auxiliary structure added, auxiliary structured removed, actively under construction, etc.), be used to associate measurements of the same object instance from different modalities or vendors together (e.g., example shown in FIG. 11), and/or otherwise used. The relationship set can be used for: insurance underwriting (e.g., verify that the originally-insured property still exists or is unchanged; determine pricing of insurance depending on the change; optimize inspection to identify where to send inspectors; determine when to reach out to adjust insurance policy when remodeling is detected; identify which properties to initiate claims for; create opportunities to proactively address property change issues before they result in insurance claims; reconcile object versions with those in their records or those that were insured; etc.), real estate property investing (e.g., identify underpriced properties that can increase in value through renovation and/or repairs; incorporate the change into a valuation model to establish the offer price; determine when construction, remodeling, and/or repairing has occurred; identify properties in portfolio that have suffered damage; etc.), real estate management (e.g., identify areas that can be renovated, repaired, added, and/or removed, etc.), real estate valuations (e.g., use change as an input to an automated valuation model; use change to detect error in property evaluation models; use change as a supplement to a property-level valuation report; etc.), real estate and loan trading (e.g., detect illegal builds; identify deterioration since prior due diligence was completed; incorporate the change into collateral valuation in mortgage origination and in secondary mortgage market; etc.), and/or otherwise used. In an illustrative example, an insurer can use the relationship set to determine whether a multi-structure campus under development, such as an apartment complex, is under-insured due to recent construction or due to other discrepancies.

However, the relationship set can be otherwise used.

Different processes and/or elements discussed above can be performed and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

All references cited herein are incorporated by reference in their entirety, except to the extent that the incorporated material is inconsistent with the express disclosure herein, in which case the language in this disclosure controls.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method comprising, by a processing system:
    extracting a timeseries of building representations for a geographic region from a timeseries of measurements of the geographic region;
    determining relationships between the building representations;
    determining a timeseries of building versions based on the relationships between the building representations, wherein each building version is defined by a set of temporally adjacent and substantially similar building representations; and
    determining, a timeseries of changes between the building versions based on the respective building representation sets, wherein the change between a prior and subsequent building version is labeled as:
        modified when the first building version shares building segments with the second building version;
        replaced when the first building version shares no building segments with the second building version;
        added when a prior building representation set represented no building and a subsequent building representation represents a building; or
        removed when the prior building representation represents a building and the subsequent building representation represents no building.

2. The method of claim 1, further comprising associating, by the processing system, auxiliary information with the building versions based on a relationship between the auxiliary information and the respective building representations associated with the building version, wherein the auxiliary information is returned responsive to a request identifying the building version.

3. The method of claim 2, wherein herein the auxiliary information associated with the building version is spatiotemporally related to the respective building representations.

4. The method of claim 2, wherein the auxiliary information and the respective building representation are extracted from the same measurement set.

5. The method of claim 1, wherein the changes between the building versions are inferred using a trained machine learning model.

6. The method of claim 1, further comprising returning, by the processing system, an analysis of the changes between a first and second building version within the timeseries of building versions responsive to a request identifying the first building version.

7. The method of claim 1, wherein the measurements comprise aerial images and the geographic region comprises a property parcel.

8. The method of claim 1, wherein different building versions have different physical building geometries.

9. The method of claim 1, wherein the building representations comprise building segments.

10. The method of claim 1, wherein the building segments are components of the building.

11. The method of claim 1, wherein the building segments comprise measurement segments.

12. The method of claim 1, wherein the building representations comprise feature vectors extracted by a model trained to be agnostic to appearance-based changes and sensitive to structural changes.

13. A system, comprising a processing system configured to:
    extract, by the processing system, building representations for each of a set of geographic regions from measurements of the respective geographic region;
    identify, by the processing system, building versions based on sets of substantially similar and temporally adjacent building representations for a geographic region;
    determine, by the processing system, spatiotemporally associated auxiliary information with each building version, wherein the spatiotemporally associated auxiliary information comprises a timeseries of changes between the building versions based on the respective building representation sets, wherein the change between a prior and subsequent building version is labeled as:
- modified when the first building version shares building segments with the second building version;
- replaced when the first building version shares no building segments with the second building version;
- added when a prior building representation set represented no building and a subsequent building representation represents a building; or
- removed when the prior building representation represents a building and the subsequent building representation represents no building;

store, by the processing system, the spatiotemporally associated auxiliary information with each building version; and return, by the processing system, auxiliary information associated with a building version responsive to a request identifying the building version.

14. The system of claim 13, wherein different building versions have different physical geometries.

15. The system of claim 13, wherein the building representations comprise feature vectors extracted by a model trained to be agnostic to appearance changes and sensitive to geometric changes.

16. The system of claim 13, wherein the system is further configured to determine, by the processing system, a set of relationships between the building versions based on the respective building representation sets, wherein an analysis based on the set of relationships is returned responsive to the request.

17. The system of claim 13, wherein the building representations comprise building segments, wherein the relationships are determined using a set of heuristics applied to a comparison between the building segments.

* * * * *